(12) United States Patent
Ciuperca

(10) Patent No.: US 9,145,695 B2
(45) Date of Patent: Sep. 29, 2015

(54) COMPOSITE INSULATED CONCRETE FORM AND METHOD OF USING SAME

(71) Applicant: Romeo Ilarian Ciuperca, Norcross, GA (US)

(72) Inventor: Romeo Ilarian Ciuperca, Norcross, GA (US)

(*) Notice: Subject to any disclaimer, the term of this patent is extended or adjusted under 35 U.S.C. 154(b) by 0 days.

(21) Appl. No.: 14/610,744

(22) Filed: Jan. 30, 2015

(65) Prior Publication Data

US 2015/0135633 A1 May 21, 2015

Related U.S. Application Data

(63) Continuation of application No. 14/040,965, filed on Sep. 30, 2013, now Pat. No. 8,950,137, and a continuation of application No. 12/753,220, filed on Apr. 2, 2010, now Pat. No. 8,555,583.

(51) Int. Cl.

| | |
|---|---|
| *E04B 2/86* | (2006.01) |
| *E04G 17/06* | (2006.01) |
| *E04G 9/05* | (2006.01) |
| *B23P 11/00* | (2006.01) |
| *E04B 2/44* | (2006.01) |
| *E04C 2/20* | (2006.01) |
| *E04C 2/288* | (2006.01) |
| *F16B 5/06* | (2006.01) |
| *F16B 19/00* | (2006.01) |
| *F16B 21/08* | (2006.01) |

(Continued)

(52) U.S. Cl.
CPC . *E04G 9/05* (2013.01); *B23P 11/00* (2013.01); *E04B 2/44* (2013.01); *E04B 2/8617* (2013.01); *E04B 2/8647* (2013.01); *E04C 2/20* (2013.01); *E04C 2/288* (2013.01); *E04C 5/07* (2013.01); *E04G 11/06* (2013.01); *E04G 17/0658* (2013.01); *F16B 5/065* (2013.01); *F16B 19/004* (2013.01); *F16B 21/086* (2013.01); *E04B 1/161* (2013.01); *E04F 13/00* (2013.01); *E04G 2017/0612* (2013.01); *F16B 21/071* (2013.01); *Y10T 29/49826* (2015.01); *Y10T 156/10* (2015.01); *Y10T 156/1057* (2015.01)

(58) Field of Classification Search
CPC ....... E04B 2/44; E04B 2/8647; E04B 2/8617; E04C 2/22; E04C 2/205; E04C 2/288; E04C 5/07; E04G 17/06; E04G 17/0758; E04G 2017/0612; E04G 2017/008; E04G 11/06; E04G 9/05
See application file for complete search history.

(56) References Cited

U.S. PATENT DOCUMENTS

| | | | |
|---|---|---|---|
| 2,053,135 | A | 9/1936 | Dalton |
| 3,199,828 | A | 8/1965 | Newton |

(Continued)

FOREIGN PATENT DOCUMENTS

| | | | |
|---|---|---|---|
| EP | 2065530 A2 * | 6/2009 | |
| JP | 11-172820 | 6/1999 | |

OTHER PUBLICATIONS

U.S. Appl. No. 14/610,744, filed Jan. 30, 2015.

(Continued)

*Primary Examiner* — Robert Canfield
(74) *Attorney, Agent, or Firm* — Richards IP Law; Robert E. Richards

(57) ABSTRACT

The invention comprises a foam insulating panel having an outer surface and a reinforcing member adhered to at least a portion of the outer surface of the foam insulating panel. An insulated concrete form and a method of using the insulated concrete form are also disclosed.

4 Claims, 18 Drawing Sheets

(51) Int. Cl.
*E04C 5/07* (2006.01)
*E04G 11/06* (2006.01)
*E04G 17/065* (2006.01)
*E04F 13/00* (2006.01)
*E04B 1/16* (2006.01)
*F16B 21/07* (2006.01)

(56) References Cited

U.S. PATENT DOCUMENTS

| | | | |
|---|---|---|---|
| 3,401,494 A * | 9/1968 | Anderson | 52/309.2 |
| 3,649,725 A | 3/1972 | Olson | |
| 3,732,138 A | 5/1973 | Almog | |
| 3,892,516 A | 7/1975 | McGrew et al. | |
| 3,985,329 A | 10/1976 | Liedgens | |
| 4,052,031 A | 10/1977 | Melfi | |
| 4,085,495 A | 4/1978 | Hebert | |
| 4,090,336 A | 5/1978 | Carroll | |
| 4,157,638 A | 6/1979 | Della-Donna | |
| 4,349,398 A | 9/1982 | Kearns et al. | |
| 4,370,840 A | 2/1983 | Bisbee et al. | |
| 4,462,949 A | 7/1984 | Fehlmann | |
| 4,516,372 A | 5/1985 | Grutsch | |
| 4,534,924 A | 8/1985 | Kariakin | |
| 4,646,498 A | 3/1987 | Schneller et al. | |
| 4,669,234 A | 6/1987 | Wilnau | |
| 4,698,947 A | 10/1987 | McKay | |
| 4,744,849 A | 5/1988 | Michaud-Soret | |
| 4,765,109 A | 8/1988 | Boeshart | |
| 4,811,927 A | 3/1989 | Slonimsky et al. | |
| 4,866,897 A | 9/1989 | Yount | |
| 4,885,888 A | 12/1989 | Young | |
| 4,889,310 A | 12/1989 | Boeshart | |
| 4,907,386 A | 3/1990 | Ekroth | |
| 5,107,648 A | 4/1992 | Roby | |
| 5,171,118 A | 12/1992 | Rothenbuhler | |
| 5,217,339 A | 6/1993 | O'Connor et al. | |
| 5,323,578 A | 6/1994 | Chagnon et al. | |
| D357,855 S | 5/1995 | Keith et al. | |
| 5,493,837 A | 2/1996 | Hepler | |
| 5,497,592 A | 3/1996 | Boeshart | |
| 5,570,550 A | 11/1996 | Roby | |
| 5,606,832 A | 3/1997 | Keith et al. | |
| 5,611,182 A | 3/1997 | Spude | |
| 5,761,874 A | 6/1998 | Hayakawa | |
| 5,765,318 A | 6/1998 | Michelsen | |
| 5,792,552 A | 8/1998 | Langkamp et al. | |
| 5,809,723 A | 9/1998 | Keith et al. | |
| 5,809,725 A | 9/1998 | Cretti | |
| 5,809,726 A | 9/1998 | Spude | |
| 5,809,728 A | 9/1998 | Tremlling | |
| 5,819,489 A | 10/1998 | McKinney | |
| 5,836,126 A | 11/1998 | Harkenrider et al. | |
| 5,966,885 A | 10/1999 | Chatelain | |
| 5,992,114 A | 11/1999 | Zelinsky et al. | |
| 6,026,620 A | 2/2000 | Spude | |
| 6,086,349 A | 7/2000 | Del Monte | |
| 6,134,861 A | 10/2000 | Spude | |
| 6,138,981 A | 10/2000 | Keith et al. | |
| 6,234,736 B1 | 5/2001 | Miescher | |
| 6,256,962 B1 * | 7/2001 | Boeshart | 52/745.09 |
| 6,263,638 B1 | 7/2001 | Long, Sr. | |
| 6,305,135 B1 | 10/2001 | Inaba | |
| 6,314,694 B1 | 11/2001 | Cooper et al. | |
| 6,360,505 B1 | 3/2002 | Johns | |
| 6,426,029 B1 | 7/2002 | Hiscock et al. | |
| 6,612,083 B1 | 9/2003 | Richards | |
| 6,688,066 B1 | 2/2004 | Cottier et al. | |
| 6,725,616 B1 | 4/2004 | Pease | |
| 6,729,090 B2 | 5/2004 | Messenger et al. | |
| 6,898,908 B2 | 5/2005 | Messenger et al. | |
| 6,898,912 B2 | 5/2005 | Bravinski | |
| 6,935,081 B2 | 8/2005 | Dunn et al. | |
| 7,000,359 B2 | 2/2006 | Meyer | |
| 7,398,131 B2 | 7/2008 | Trost et al. | |
| 7,409,800 B2 | 8/2008 | Budge | |
| 7,765,761 B2 | 8/2010 | Paradis | |
| 7,818,935 B2 | 10/2010 | Velickovic | |
| 7,934,693 B2 | 5/2011 | Bravinski | |
| 8,032,244 B2 | 10/2011 | Trost et al. | |
| 8,532,815 B1 | 9/2013 | Ciuperca | |
| 8,545,749 B2 | 10/2013 | Ciuperca | |
| 8,555,583 B2 | 10/2013 | Ciuperca | |
| 8,555,584 B2 | 10/2013 | Ciuperca | |
| 8,636,941 B1 | 1/2014 | Ciuperca | |
| 8,745,943 B2 | 6/2014 | Ciuperca | |
| 8,756,890 B2 | 6/2014 | Ciuperca | |
| 8,844,227 B1 | 9/2014 | Ciuperca | |
| 8,855,803 B2 | 10/2014 | Ciuperca | |
| 8,877,329 B2 | 11/2014 | Ciuperca | |
| 8,966,845 B1 | 3/2015 | Ciuperca | |
| 2002/0005725 A1 | 1/2002 | Scott | |
| 2002/0092253 A1 | 7/2002 | Beliveau | |
| 2003/0192272 A1 | 10/2003 | Bravinski | |
| 2004/0006942 A1 * | 1/2004 | Greenway | 52/309.8 |
| 2004/0035073 A1 * | 2/2004 | Bravinski | 52/426 |
| 2004/0055237 A1 * | 3/2004 | Bravinski | 52/426 |
| 2004/0129857 A1 | 7/2004 | Musk et al. | |
| 2005/0108985 A1 | 5/2005 | Bravinski | |
| 2007/0062143 A1 | 3/2007 | Noushad | |
| 2007/0095255 A1 | 5/2007 | Abbate et al. | |
| 2007/0144653 A1 | 6/2007 | Padilla et al. | |
| 2008/0041004 A1 | 2/2008 | Gibbar et al. | |
| 2008/0173788 A1 | 7/2008 | Brewka et al. | |
| 2008/0313991 A1 | 12/2008 | Chouinard | |
| 2009/0202307 A1 | 8/2009 | Au et al. | |
| 2009/0218474 A1 | 9/2009 | Bowman | |
| 2009/0277103 A1 | 11/2009 | De Jaham | |
| 2010/0062667 A1 | 3/2010 | Pan et al. | |
| 2010/0162659 A1 | 7/2010 | Laprise | |
| 2010/0192498 A1 | 8/2010 | Gleckman | |
| 2010/0232877 A1 | 9/2010 | Sanvik et al. | |
| 2010/0319295 A1 | 12/2010 | Nelson | |
| 2011/0057090 A1 | 3/2011 | Spude et al. | |
| 2011/0239566 A1 | 10/2011 | Ciuperca | |
| 2012/0058299 A1 | 3/2012 | Serwin | |
| 2012/0180411 A1 * | 7/2012 | Trimmer et al. | 52/220.1 |
| 2013/0074432 A1 | 3/2013 | Ciuperca | |
| 2013/0074433 A1 | 3/2013 | Ciuperca | |
| 2013/0119576 A1 | 5/2013 | Ciuperca | |
| 2014/0041329 A1 | 2/2014 | Ciuperca | |
| 2014/0083333 A1 | 3/2014 | Ciuperca | |
| 2014/0084132 A1 | 3/2014 | Ciuperca | |
| 2014/0087158 A1 | 3/2014 | Ciuperca | |
| 2014/0088756 A1 | 3/2014 | Ciuperca | |
| 2014/0174647 A1 | 6/2014 | Ciuperca | |
| 2014/0212643 A1 | 7/2014 | Ciuperca | |
| 2014/0260034 A1 | 9/2014 | Ciuperca | |
| 2014/0263942 A1 | 9/2014 | Ciuperca | |
| 2014/0272302 A1 | 9/2014 | Ciuperca | |
| 2014/0312524 A1 | 10/2014 | Ciuperca | |
| 2014/0319316 A1 * | 10/2014 | Bergman | 249/48 |
| 2014/0332658 A1 | 11/2014 | Ciuperca | |
| 2014/0333004 A1 | 11/2014 | Ciuperca | |
| 2014/0333010 A1 | 11/2014 | Ciuperca | |
| 2015/0007524 A1 | 1/2015 | Ciuperca | |
| 2015/0014300 A1 | 1/2015 | Ciuperca | |

OTHER PUBLICATIONS

U.S. Appl. No. 14/311,310, filed Jan. 30, 2015.
U.S. Appl. No. 14/227,490, filed Mar. 27, 2015.
U.S. Appl. No. 14/499,205, filed Sep. 28, 2014.
U.S. Appl. No. 14/531,644, filed Nov. 3, 2014.
U.S. Appl. No. 13/626,103, filed Sep. 25, 2012.
U.S. Appl. No. 14/610,772, filed Jan. 30, 2015.
U.S. Appl. No. 14/165,630, filed Jan. 28, 2014.
U.S. Appl. No. 14/499,208, filed Sep. 28, 2014.
U.S. Appl. No. 13/834,697, filed Mar. 15, 2013.
U.S. Appl. No. 14/214,815, filed Mar. 15, 2014.
U.S. Appl. No. 14/275,854, filed May 12, 2014.
U.S. Appl. No. 14/275,833, filed May 12, 2014.

(56) References Cited

OTHER PUBLICATIONS

U.S. Appl. No. 14/480,948, filed Sep. 9, 2014.
U.S. Appl. No. 14/480,967, filed Sep. 9, 2014.
U.S. Appl. No. 14/229,566, filed Mar. 28, 2014.
European Search Report for application 12835221.8 which corresponds to U.S. Appl. No. 14/311,310, filed Jun. 22, 2014 and U.S. Pat. No. 8,756,890.
English translation of Abstract for Japanese Publication No. 11172820.

* cited by examiner

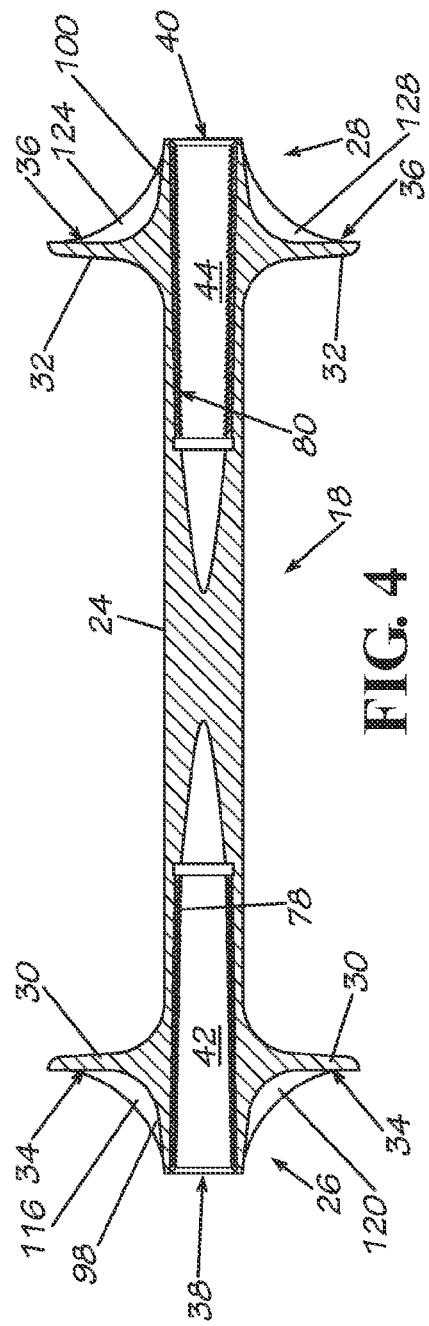
FIG. 4
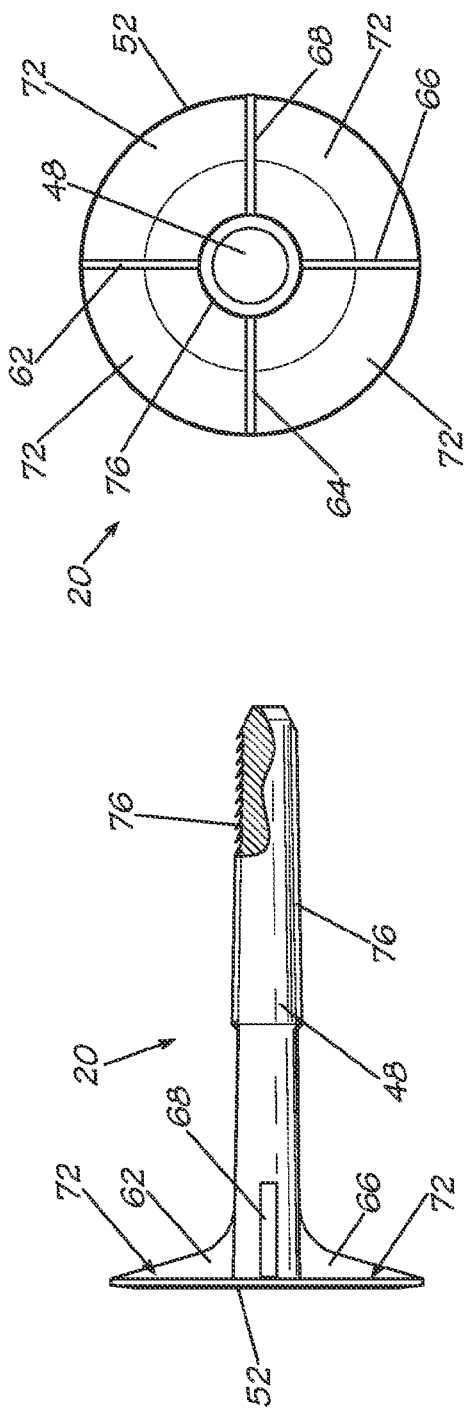
FIG. 6
FIG. 5

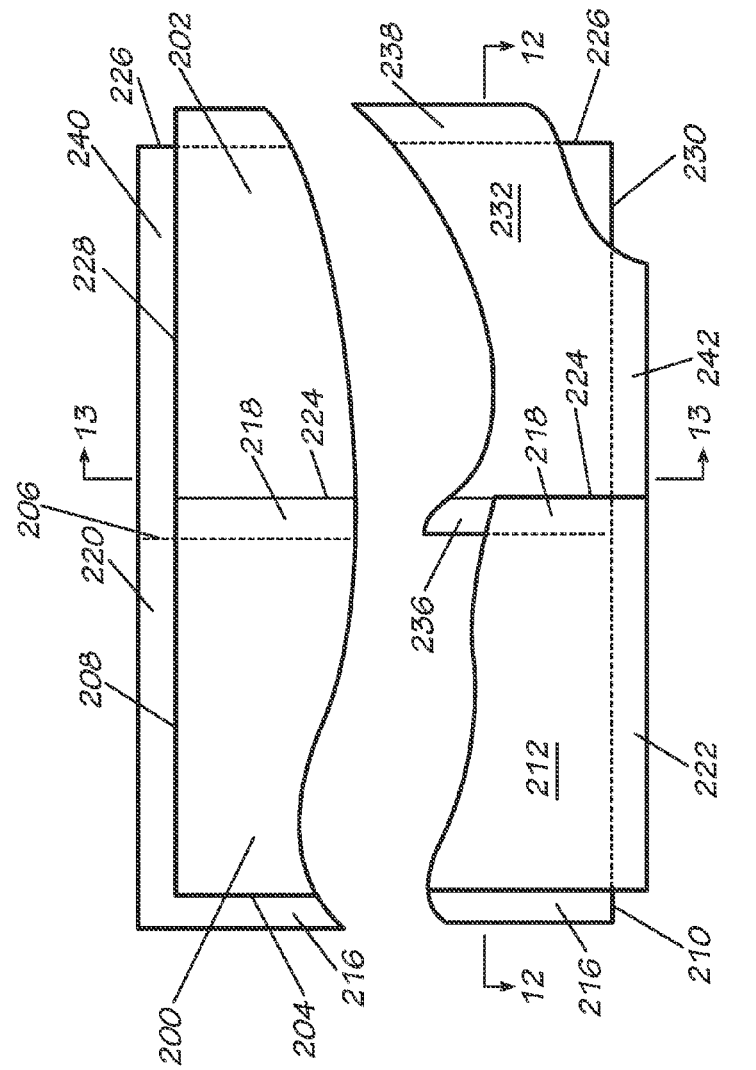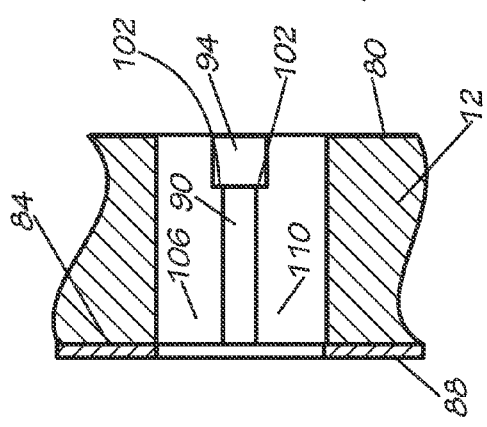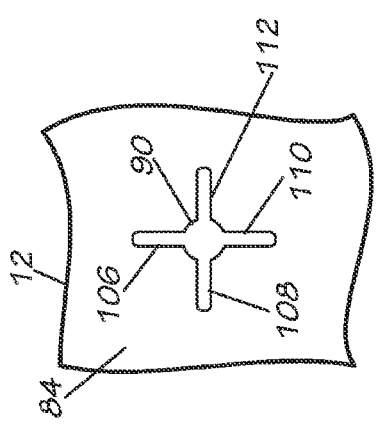

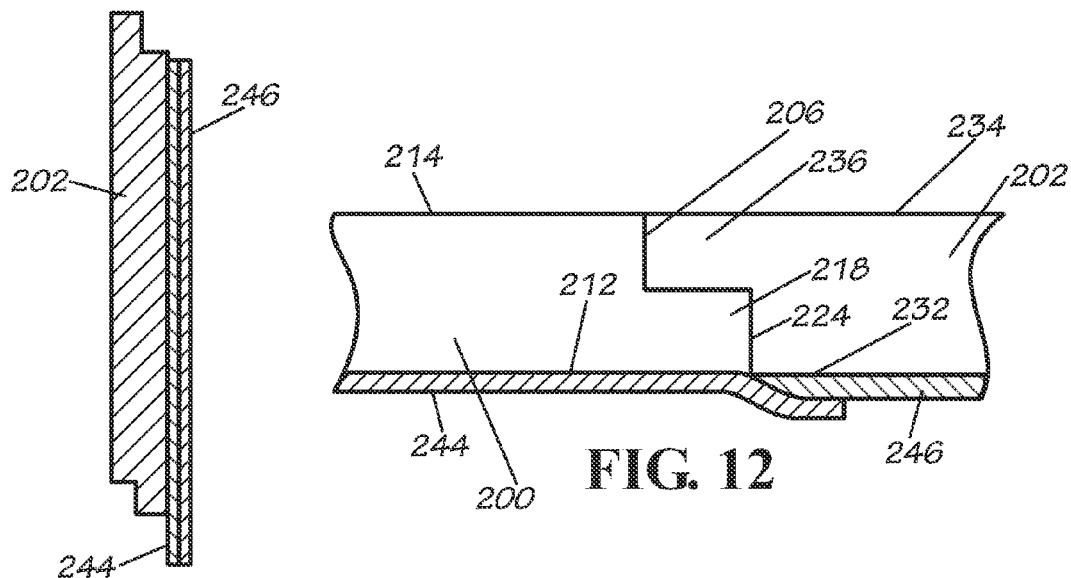
FIG. 12
FIG. 13
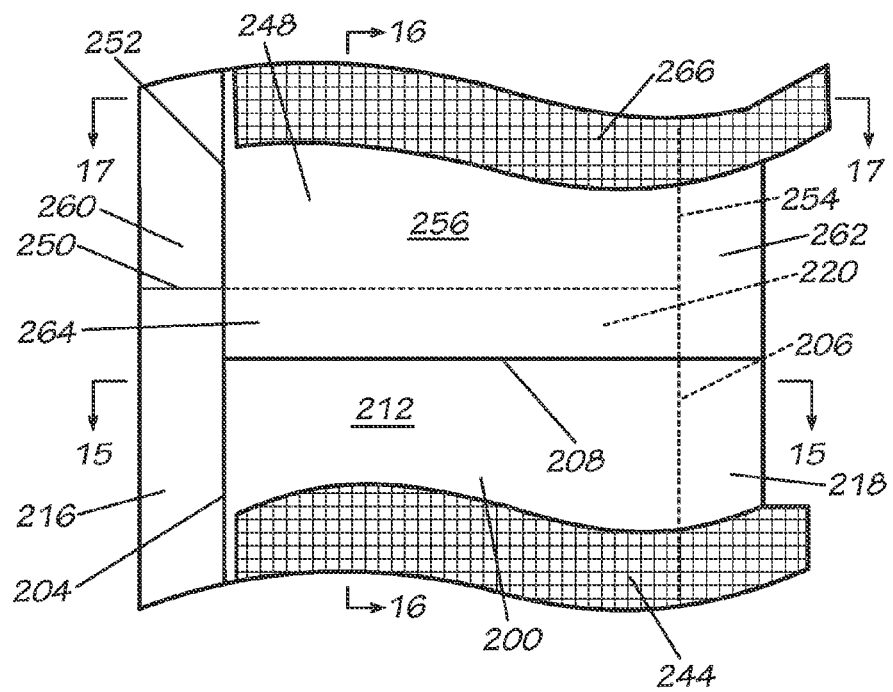
FIG. 14

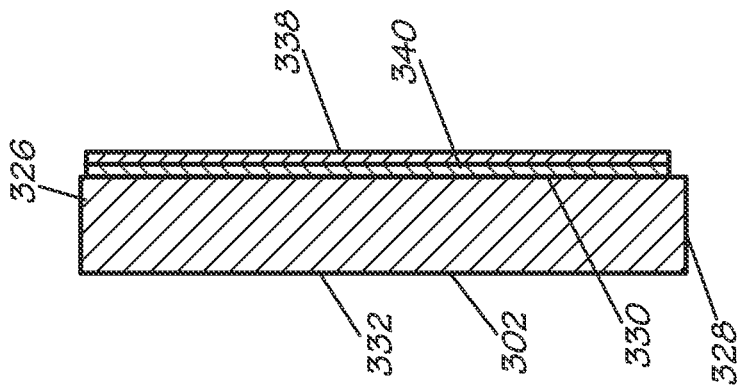
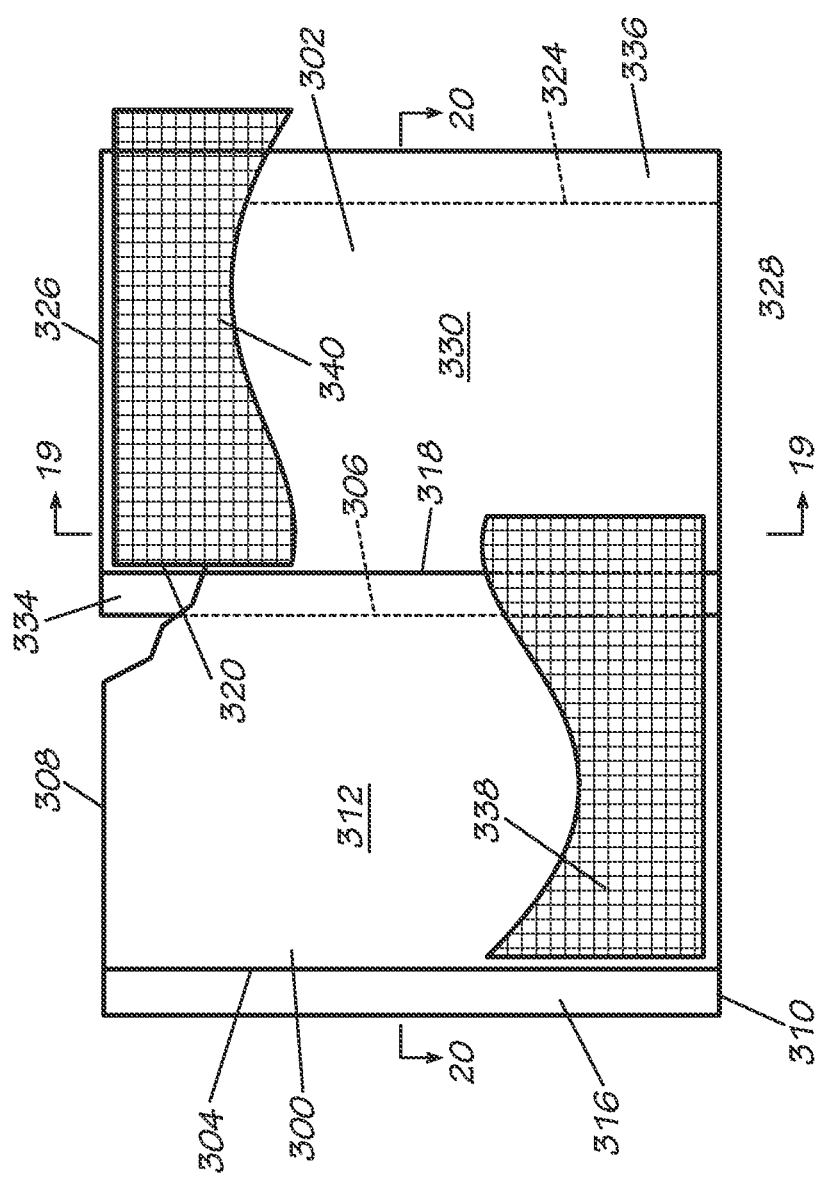

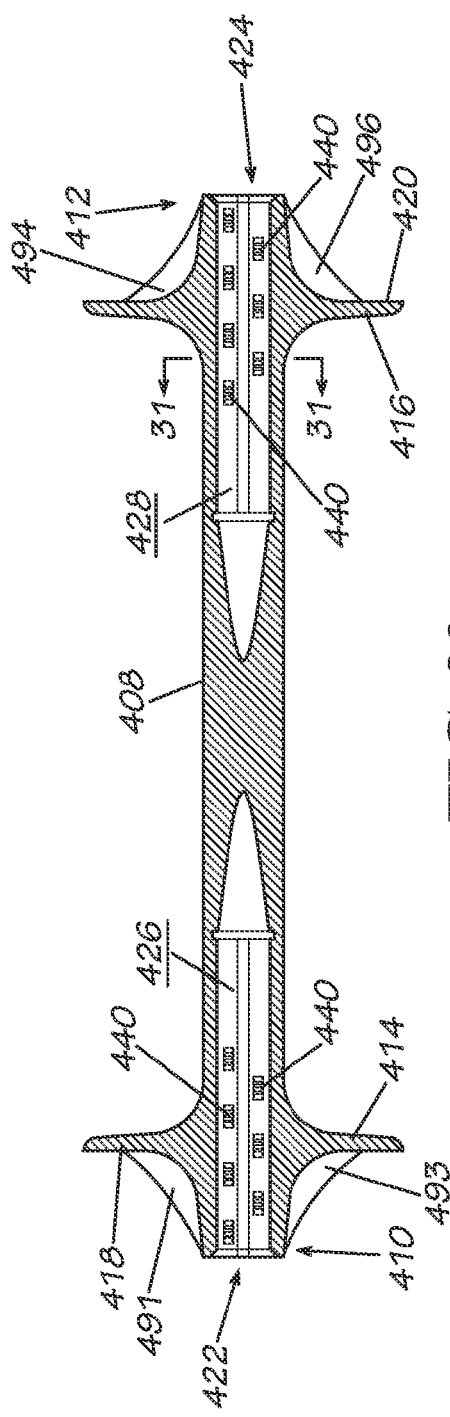
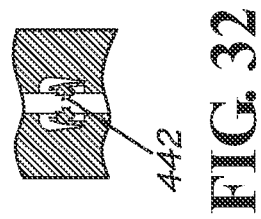
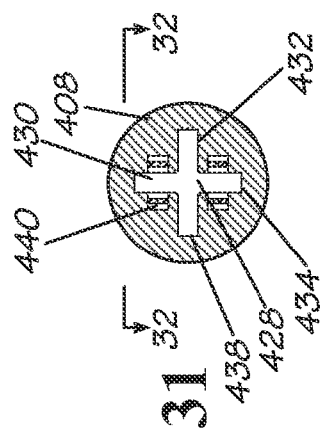
FIG. 30
FIG. 31
FIG. 32

COMPOSITE INSULATED CONCRETE FORM AND METHOD OF USING SAME

CROSS-REFERENCE TO RELATED APPLICATIONS

The resent application is a continuation of application Ser. No. 14/040,865 filed Sep. 30, 2013, which is a continuation of application Ser. No. 12/753,220 filed Apr. 2, 2010, which is now U.S. Pat. No. 8,555,583.

FIELD OF THE INVENTION

The present invention generally relates to insulated concrete forms. More particularly, this invention relates to an insulated concrete form that is stronger than conventional insulated concrete forms so that it can extend from floor to ceiling. The present invention also relates to an insulated concrete form that is easier to make and easier to use. The present invention also relates to methods of using the insulated concrete form of the present invention.

BACKGROUND OF THE INVENTION

Concrete walls and other concrete structures have traditionally been made by building a form. The forms were usually made from plywood, wood, metal and other structural members. Unhardened concrete was poured into the form space defined by opposed spaced forms. Once the concrete hardened, the forms were removed leaving a concrete wall or other concrete structure or structural member. The exposed concrete wall is exposed to the elements and subject to curing. Several different methods are used to cure concrete, many of which lessen the maximum potential curing strength.

Insulated concrete form systems are known in the prior art and typically are made from a plurality of modular form members. In order to assist in keeping the modular panel members properly spaced when concrete is poured between the forms, transverse tie members are used in order to prevent transverse displacement of the walls due to the hydrostatic pressure created by the fluid and unhardened concrete. U.S. Pat. Nos. 5,497,592; 5,809,725; 6,668,503; 6,898,912 and 7,125,547 (the disclosures of which are incorporated herein by reference) are exemplary of prior art modular insulated concrete form systems.

Such prior art insulated concrete form systems suffer from several common problems. First, in the construction of an exterior wall of a building, multiple insulated concrete form modules would be stacked upon and adjacent each other in order to form the wall form. In some insulated concrete form systems, the form spacers/interconnectors are placed between adjacent concrete form modules. Such form systems are not strong enough to build a form more than a few feet high. Concrete is then placed in the form and allowed to harden before another course of insulating forms are added on top of the existing forms. Such systems result in cold joints between the various concrete layers necessary to form a floor to ceiling wall or a multi-story building. Cold joints in a concrete wall weaken the wall therefore requiring that the wall be thicker and/or the use of higher strength concrete than would otherwise be necessary with a wall that did not have cold joints. This generally limits current use of insulated concrete forms to buildings of a single story or two in height or to infill wall applications.

Second, the use of multiple form modules to form a wall or other building structure creates numerous joints between adjacent concrete form modules; i.e., between both horizontally adjacent form modules and vertically adjacent form modules. Such joints provide numerous opportunities for water from the concrete mix to leak out of the form. The proper amount of water and heat is necessary for concrete to harden to its maximum potential strength. Thus, the loss of water through leaky joints in adjacent form modules reduces the strength of the concrete.

Third, prior art modular concrete form systems are difficult and time consuming to put together, particularly at a constructions site using unskilled labor.

It would therefore be desirable to provide an insulated concrete form system that is relatively easy to assemble, is stronger and permits the construction of a floor to ceiling high wall without cold joints. It would further be desirable to provide an insulated concrete form system that reduces or eliminates water leakage from an unhardened concrete mix placed in the form that would thereby allow the concrete to retain the moisture necessary for its proper curing to achieve its maximum strength.

SUMMARY OF THE INVENTION

The present invention satisfies the foregoing needs by providing a foam insulating panel having an outer surface and a reinforcing member adhered to at least a portion of the outer surface of the foam insulating panel.

In an alternate disclosed embodiment, the present invention comprises an insulated concrete form including a first plurality of adjacent foam insulating panels forming an inner concrete form member, at least one of the first plurality of foam insulating panels extending vertically from a footing or floor member to a ceiling member and a second plurality of adjacent foam insulating panels forming an outer concrete form member, at least one of the second plurality of foam insulating panels extending vertically from the footing or floor member to the ceiling member. The inner concrete form member are spaced from the outer concrete form member and define a concrete receiving space therebetween. The first plurality of adjacent foam insulating panels have substantially waterproof joints formed between adjacent foam insulating panels and between the panels and the footing or floor member. The second plurality of adjacent foam insulating panels have substantially waterproof joints formed between adjacent foam insulating panels and between those panels and the footing or floor member such that when a concrete mixture including water is introduced into the concrete receiving space, water from the concrete mixture is substantially retained by the foam insulating panels.

In another alternate disclosed embodiment, the present invention comprises a connector for a pair of opposed spaced foam insulating panels. The connector includes an elongate spacer member having flanges formed adjacent opposite ends thereof, the spacer member having an axial bore formed in each end for receiving an elongate shaft of a connecting pin. The connecting pin has an elongate shaft and an enlarged head portion formed adjacent one end thereof, the end of the shaft opposite the enlarged head portion being adapted to be received in one of the axial bores in the spacer member, the shaft having teeth formed thereon. Each of the axial bores having corresponding teeth formed therein. The teeth of the shaft and the teeth of the axial bore being adapted to mate with each other such that the shaft can be inserted into one of the axial bores, but the teeth will resist the removal of the shaft therefrom.

In another alternate disclosed embodiment, the present invention comprises a method of making an insulated concrete form. The method includes vertically positioning a first foam insulating panel having an outer surface having a reinforcing material adhered thereto, a portion of the reinforcing material extending outwardly from at least a portion of a longitudinal edge of the first foam insulating panel. A second foam insulating panel is vertically positioned adjacent the first foam insulating panel. At least a portion of the reinforcing web of the first foam insulating panel is adhered to the second foam insulating panel.

In another alternate disclosed embodiment, the present invention comprises a method of making an insulated concrete form. The method includes vertically positioning a foam insulating panel on a support member, the foam insulating panel having an outer surface having a reinforcing material adhered thereto, a portion of the reinforcing material extending outwardly from at least one edge of the foam insulating panel. The method further includes adhering at least a portion of the reinforcing material to the support member.

In another alternate disclosed embodiment, the present invention comprises a method of making an insulated concrete form. The method includes vertically positioning a first foam insulating panel and vertically positioning a second foam insulating panel adjacent the first foam insulating panel, such that a longitudinal joint is formed therebetween. The method further include adhering the first and second foam insulating panels to each other with an adhesive such that the longitudinal joint is substantially water-proof.

In another alternate disclosed embodiment, the present invention comprises a method of making an insulated concrete form. The method includes vertically positioning a foam insulating panel on a support member, a transverse joint being formed between the foam insulating panel and the support member and adhering the foam insulating panel to the support member with an adhesive such that the transverse joint is substantially water-proof.

In another alternate disclosed embodiment, the present invention comprises a method of making an insulated concrete form. The method includes vertically positioning an inner foam insulating panel on a floor, the inner foam insulating panel extending vertically from the floor to the height of a bottom surface of a ceiling above the floor. The method also includes vertically positioning an outer foam insulating panel on the floor, the outer foam insulating panel extending vertically from the concrete floor to the height of a top surface of the ceiling above the floor.

In another alternate disclosed embodiment, the present invention comprises vertically positioning an inner foam insulating panel on a floor member, the inner foam insulating panel extending vertically from the floor member to the height of a ceiling above the floor and vertically positioning an outer foam insulating panel on the floor member, the outer foam insulating panel extending vertically from the floor member to the height of the ceiling above the floor, the inner and outer foam insulating panels defining a concrete receiving space therebetween. The method further includes introducing unhardened concrete in the concrete receiving space in multiple portions from floor height to ceiling height without cold joints and whereby the hydrostatic pressure from the unhardened concrete is insufficient to rupture the foam insulating panels.

In another alternate disclosed embodiment, the present invention comprises a poured concrete wall formed using foam insulating panels as the form therefor, wherein the concrete wall does not have any cold joints in the concrete from the floor height to the ceiling height.

In another alternate disclosed embodiment, the present invention comprises a poured concrete wall formed using foam insulating panels as the form therefor and an integral concrete deck, wherein the concrete wall does not have any cold joints in the concrete from the floor height to the ceiling height and there are no cold joint between the concrete wall and the concrete deck.

In another alternate disclosed embodiment, the present invention comprises a retaining pin for a foam insulating panel. The retaining pin includes an elongate shaft having an enlarge head portion adjacent one end thereof and a portion of the shaft opposite the enlarged head portion having teeth formed thereon, the teeth being adapted to mate with corresponding teeth in an axial bore of a spacer member.

In another alternate disclosed embodiment, the present invention comprises a spacer member for foam insulating panels. The spacer member includes an elongate member having flanges formed adjacent opposite ends thereof, the spacer member having an axial bore formed in each end for receiving an elongate shaft portion of a connecting pin, the shaft portion having teeth formed thereon. The spacer member further includes teeth formed in each of the axial bores, the teeth being adapted to mate with the corresponding teeth on the shaft portion of the connecting pin.

In another alternate disclosed embodiment, the present invention comprises a foam insulating panel, the foam insulating panel being generally rectangular, having an inner surface and an outer surface and having a first transverse edge and an second transverse edge, the outer surface being longer in a longitudinal direction than the inner surface adjacent the first transverse edge and the inner surface being longer in a longitudinal direction than the outer surface adjacent a second transverse edge.

In another alternate disclosed embodiment, the present invention comprises an insulted concrete form. The concrete form includes a rectangular interior foam insulating panel, the interior foam insulating panel having a first transverse edge and a second transverse edge. The concrete form also includes a rectangular exterior foam insulating panel parallel to and spaced from the interior foam insulating panel, the exterior foam insulating panel having a first transverse edge and a second transverse edge, the interior and exterior foam insulating panels being oriented vertically. The first transverse edge of the interior foam insulating panel is horizontally aligned with the first transverse edge of the exterior foam insulating panel and the second transverse edge of the exterior foam insulating panel is vertically higher than the second transverse edge of the interior foam insulating panel.

In another alternate disclosed embodiment, the present invention comprises a pin spacer and retainer system for an insulated concrete form. The pin spacer and retainer includes a first elongate shaft member having a first enlarged head portion at one end of the shaft member and a first hole formed in the shaft member adjacent the end opposite the enlarged head portion. The pin spacer and retainer also includes a second elongate shaft member having a second enlarged head portion at one end of the second shaft member and a second hole formed in the second shaft member adjacent the end opposite the second enlarged head portion. A pin locking member extending through the first and second holes.

Accordingly, it is an object of the present invention to provide an improved insulated concrete form system.

Another object of the present invention is to provide an insulated concrete form system that is relatively easy to manufacture and/or to assemble.

Still another object of the present invention is to provide an insulated concrete form system that is substantially water-proof A further object of the present invention is to provide an insulated concrete form system that will form a floor to ceiling high wall without cold joints therein.

Another object of the present invention is to provide an insulated concrete form system that will form a floor to ceiling high wall and an integral concrete deck without cold joints therein.

Still another object of the present invention is to provide an insulated concrete form system that produced a stronger concrete wall than prior art insulated concrete form systems or any other concrete form system.

Yet another object of the present invention is to provide an improved pin and panel spacer for an insulated concrete form system.

Another object of the present invention is to provide a system for constructing a relatively high energy efficiency exterior building envelope.

Still another object of the present invention is to provide a system for curing of concrete that result in concrete with increased strength, durability and resistance to abrasion.

Another object of the present invention is to provide an insulated concrete form system that keeps concrete moist, by preventing the loss of moisture from the concrete during the period in which it is gaining strength and durability.

Still another object of the present invention is to provide an insulated concrete form system that produces hard, dense concrete with improved resistance to abrasion and corrosive actions in addition to minimizing shrinkage and permeability of the concrete.

Another object of the present invention is to provide an insulated concrete form system that provides improved temperature stability for the curing of concrete.

A further object of the present invention is to provide an insulated concrete form system that permits the placement of concrete during cold weather which thereby allows construction projects to proceed rather than be shutdown due to inclement weather.

Yet another object of the present invention is to provide an insulated concrete form that has a reinforcing layer on the outer surface of the foam insulating panel that provides a substrate for attaching decorative surfaces, such as ceramic tile, stone, thin brick, stucco or the like.

These and other objects, features and advantages of the present invention will become apparent after a review of the following detailed description of the disclosed embodiments and the appended drawing and claims.

BRIEF DESCRIPTION OF THE DRAWINGS

FIG. 4 is a cross-sectional view taken along the line 4-4 of the foam insulating panel spacer shown in FIG. 3

FIG. 5 is a partial cross-sectional side view of the pin member shown in FIG. 3.

FIG. 6 is an end view of the pin member shown in FIG. 5.

FIG. 7 is a detailed partial cross-sectional view of a foam insulating panel in accordance with a disclosed embodiment of the present invention.

FIG. 8 is a detailed partial side plan view of the foam insulating panel shown in FIG. 7.

FIG. 9 is a side plan view of two horizontally adjacent exterior foam insulating panels in accordance with a disclosed embodiment of the present invention shown without a layer of reinforcing material on a outer surface thereof for clarity. Relative sizes of the flanges have been exaggerated for clarity. Pin/spacer assemblies are also not shown for clarity.

FIG. 12 is a partial cross-sectional view taken along the line 12-12 of the foam insulating panels shown in FIG. 9. Relative sizes of the flanges have been exaggerated for clarity. Pin/spacer assemblies are also not shown for clarity.

FIG. 13 is a cross-sectional view taken along the line 13-13 of the foam insulating panels shown in FIG. 9. Relative sizes of the flanges have been exaggerated for clarity. Pin/spacer assemblies are also not shown for clarity.

FIG. 14 is a partial side plan view of two vertically adjacent exterior foam insulating panels in accordance with a disclosed embodiment of the present invention shown with the reinforcing material partially cut away for clarity purposes. Relative sizes of the flanges have been exaggerated for clarity. Pin/spacer assemblies are also not shown for clarity.

FIG. 18 is a side plan view of two horizontally adjacent interior foam insulating panels in accordance with a disclosed embodiment of the present invention shown with the reinforcing material partially cut away for clarity purposes. Relative sizes of the flanges have been exaggerated for clarity. Pin/spacer assemblies are also not shown for clarity.

FIG. 19 is a cross-sectional view taken along the line 19-19 of the foam insulating panels shown in FIG. 18. Relative sizes of the flanges have been exaggerated for clarity. Pin/spacer assemblies are also not shown for clarity.

FIG. 30 is a cross-sectional side view of the panel spacer member shown in FIG. 29.

FIG. 31 is an end view of the panel spacer member shown in FIG. 29.

FIG. 32 is a partial cross-sectional view taken along the line 32-32 of the panel spacer member shown in FIG. 30.

DETAILED DESCRIPTION OF THE DISCLOSED EMBODIMENTS

As used herein, the term "substantially water-proof" means that the insulated concrete form will retain a sufficient amount of water such that the concrete achieves a hardness greater than would be achieved through the use of a conventional concrete form or that an immeasurable amount of water leaks around and/or through the insulated concrete form.

Figure 1:
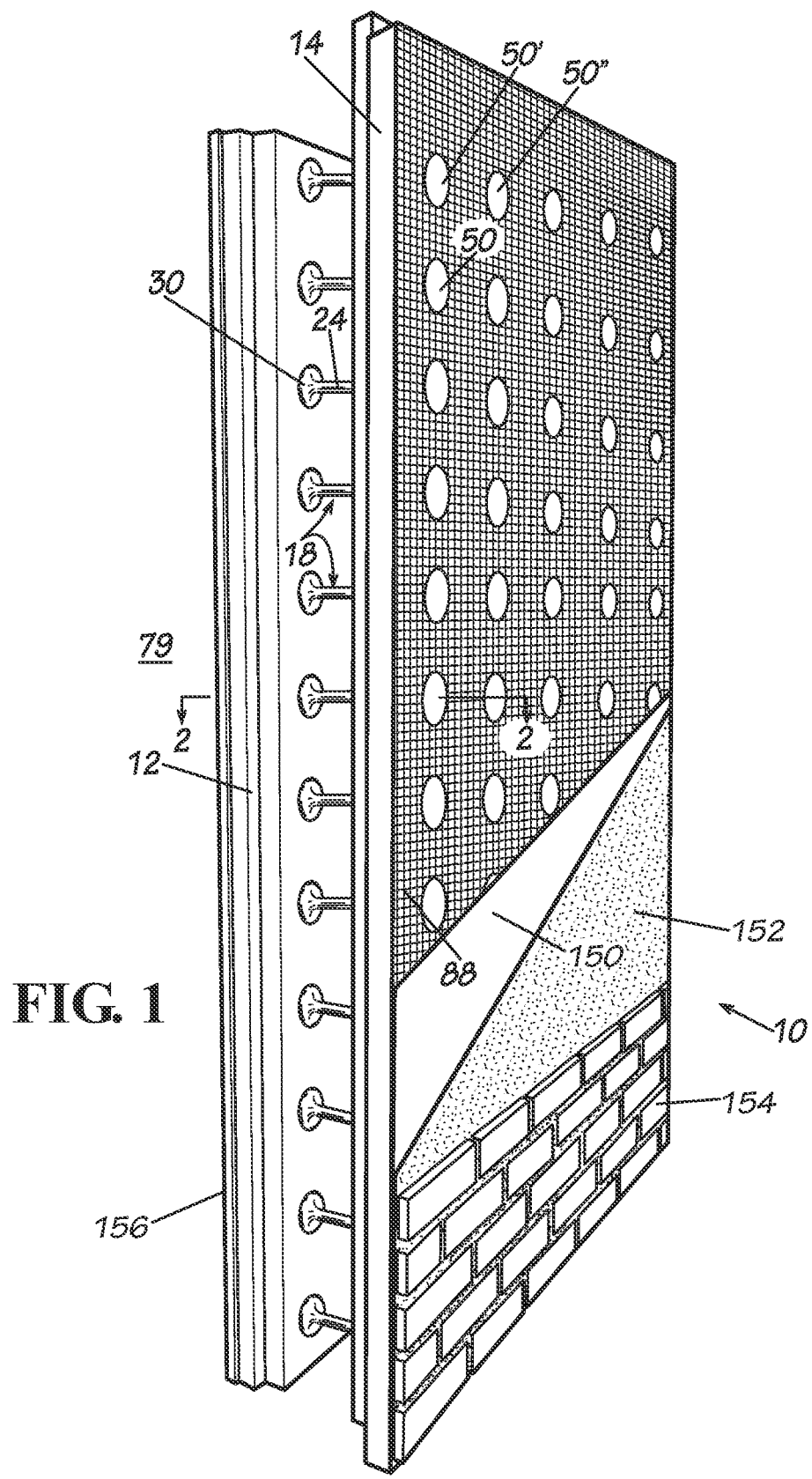
FIG. 1 is a partial perspective view of an insulated concrete form in accordance with a disclosed embodiment of the present invention.

Referring now to the drawing in which like numbers indicate like elements throughout the several views, there is shown in FIG. 1 a disclosed embodiment of an insulated concrete form 10 in accordance with the present invention. The insulated concrete form 10 includes a first foam insulating panel 12 generally parallel to and spaced apart from a second foam insulating panel 14. The foam insulating panels 12, 14 are preferably made from a polymeric foam material, such as expanded polystyrene. Expanded polystyrene is available under the trademark Neopor® and is available from BASF Corporation, Atlanta, Ga. The foam insulating panels 12, 14 can be made by molding to the desired size and shape or by cutting blocks or sheets of pre-formed expanded polystyrene into a desired size and shape. Although the foam insulating panels 12, 14 can be of any desired size, it is specifically contemplated that the panels will be of a height equal to the distance from a floor to a ceiling where an exterior building wall is to be constructed. Thus, the height of the foam insulating panels will vary depending on the ceiling height of the particular building construction. However, for ease of handling, the foam insulating panels will generally be 9 feet 6 inches high and 4 feet 1 inches wide. These dimension will also very depending on whether the panels are the interior panel or the exterior panel, as will be explained further below.

The foam insulation panels 12, 14 are held in their spaced apart relationship by a plurality of spacer/pin assemblies 16. The spacer/pin assembly 16 (FIG. 3) is preferably formed from a polymeric material, such as polyethylene, polypropylene, nylon or the like. The spacer/pin assembly 16 can be formed by any suitable process, such as by injection molding.

The spacer/pin assemblies 16 include three separate pieces: a panel spacer member 18, a first pin member 20 and a second pin member 22. The panel spacer member 18 includes an elongate central rod member 24. The central rod member 24 can be any suitable shape, but in this embodiment is shown as having a generally circular cross-sectional shape. Formed adjacent each end 26, 28 of the central rod member 24 are annular flanges 30, 32 that extend radially outwardly from the central rod member. Each of the annular flanges 30, 32 includes a generally flat foam insulating panel contacting portion 34, 36, respectively. Formed in each end 26, 28 of the panel spacer member 18 are axially aligned bores 38, 40, respectively. The axially aligned bores 38, 40 provide pin receiving cavities 42, 44, respectively, which extend inwardly toward the midpoint of the elongate rod member 24. The pin receiving cavities 42, 44 are generally circular in cross-sectional shape.

The first and second pin members 22, 20 are identical in configuration and each includes an elongate shaft portion 46, 48, respectively, and an enlarged head portion 50, 52, respectively, at one end thereof. The elongate shaft portions 46, 48 are each generally circular in cross-sectional shape and are of a length such that the shaft portion can extend all of the way through the thickness of the foam insulating panels 12, 14. The enlarged head portions 50, 52 are each generally of a flat disk shape and each includes four stiffening wings 54, 56, 58, 60 and 62, 64, 66, 68 (FIGS. 3, 5 and 6), respectively, extending from the enlarged head portions to the elongate shaft portions 46, 48 and are spaced evenly around the circumference of the enlarged head portions. The stiffening wings 54-68 provide extra strength to the enlarged head portions 50, 52 of the first and second pin members 22, 20. Each of the enlarged head portions 50, 52 includes a generally flat foam insulating panel contacting portion 70, 72 (FIGS. 3, 5 and 6), respectively, adjacent it circumferential edge. Formed on each of the shaft portions 46, 48 of the first and second pin members 22, 20 adjacent the ends opposite the enlarged head portions 50, 52 are teeth 74, 76, respectively. The teeth 74, 76 are angled toward the enlarged head portions 50, 52, respectively, and extend around the entire circumference of the shaft portions 46, 48. Teeth 78, 80 sized and shaped to mate with the teeth 74, 76 are formed on the inner surface of the pin receiving cavities 42, 44, respectively, and extend around the entire inner circumference of the pin receiving cavities. The teeth 78, 80 are angled toward the ends 26, 28 of the central rod member 24. The outer diameter of the shaft portions 46, 48 and the inner diameter of the pin receiving cavities 42, 44 and the material from which the teeth 74-80 are made are such that the teeth will flex sufficiently to allow the shaft portions 46, 48 to be inserted into the pin receiving cavities 42, 44. However, after the shaft portions 46, 48 are inserted into the pin receiving cavities 42, 44, the teeth 74, 76 mate with the teeth 78, 80, respectively, and prevent removal of the shaft portions from the pin receiving cavities. The teeth 74-80 therefore provide a one-way locking mechanism; i.e., the first and second pin members 20, 22 can be relatively easily inserted into the panel spacer member 18, but once inserted, the pin members are locked in place and cannot be removed from the panel spacer member under normal, expected pressure loads.

Figure 2:
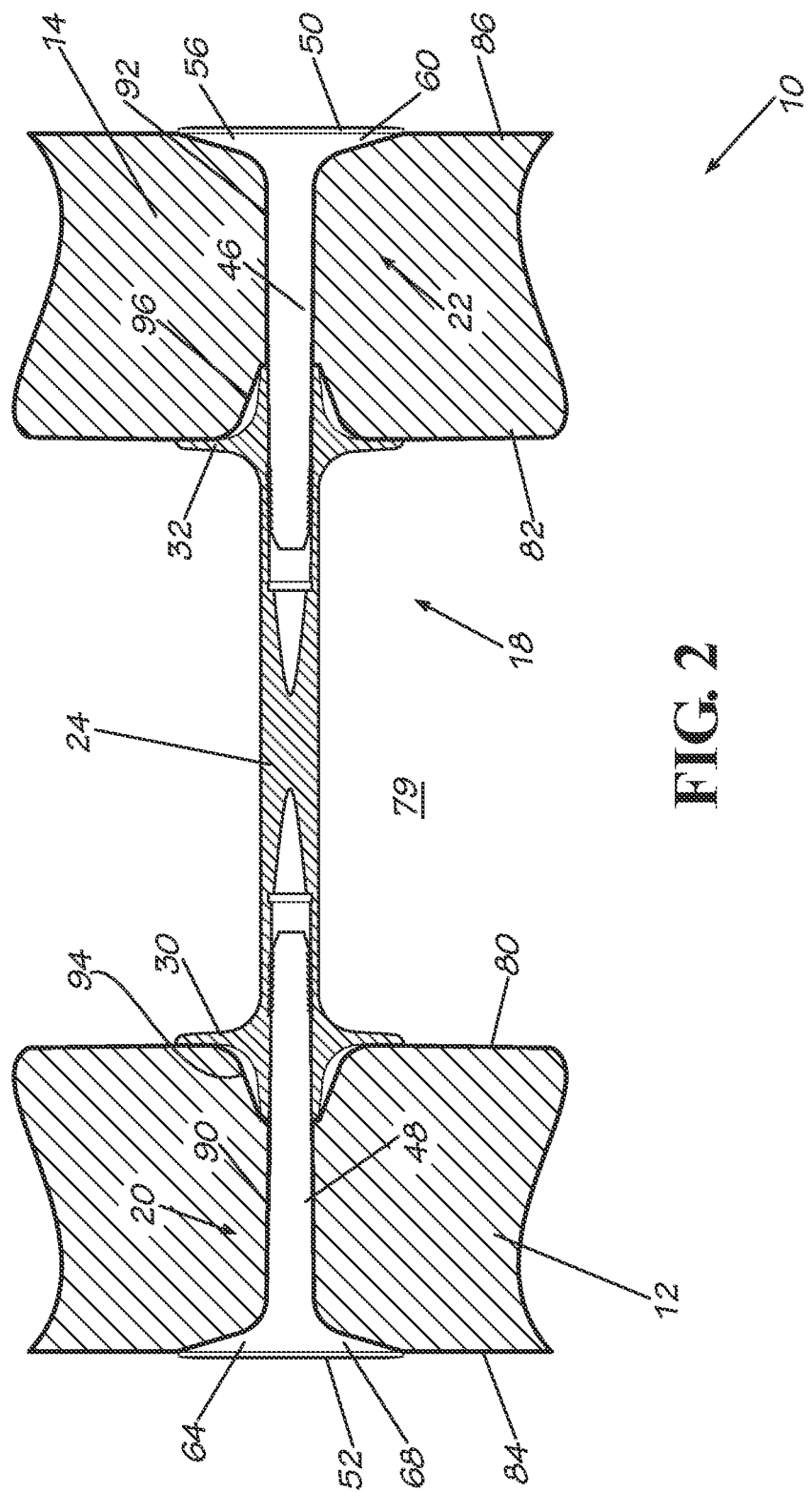
FIG. 2 is a cross-sectional side view taken along the line 2-2 of insulated concrete form shown in FIG. 1

Insulated concrete forms are used to form exterior walls of buildings and other similar structures. When forming such an exterior wall, one form is the exterior form and the other form is the interior form. The two forms define a concrete receiving space there between. As shown in FIG. 2, the insulated concrete forms 10 in accordance with a disclosed embodiment of the present invention comprises two parallel, spaced apart foam insulating panels 12, 14. As shown if FIGS. 1 and 2, the foam insulating panel 14 is the exterior form and the foam insulating panel 12 is the interior form. The two foam insulating panels 12, 14 define a concrete receiving space 79 there between. Each of the foam insulating panels 12, 14 has an inner surface 80, 82 and an outer surface 84, 86, respectively. The inner surfaces 80, 82 of the foam insulating panels 12, 14 face toward the concrete receiving space 79. It is optional, but highly desirable, to adhere a layer of reinforcing material 88 to each of the outer surfaces 84, 86 of the foam insulating panels 12, 14. The layer of reinforcing material is disposed between the outer surfaces 84, 86 of the foam insulting panels 12, 14 and the enlarged head portions 50, 52 of the pins 22, 20. The layer of reinforcing material 88 helps to distribute the pulling force from the enlarged head portions 50, 52 across the outer surface 84, 86 of the foam insulating panels 12, 14. The layer of reinforcing material 88 can be made from material such as plastic, for example polyethylene, polypropylene or fiberglass. The layer of reinforcing material 88 can be in the form of a continuous layer, fabric or sheet or in the form of a discontinuous layer, mesh or web. The layer of reinforcing material 88 can be adhered to outer surfaces 84, 86 of the foam insulating panels 12, 14 by a conventional adhesive. The adhesive can be applied to the outer surfaces 84, 86 of the foam insulating panels 12, 14 by any means, such as by brushing or spraying, and then the layer of reinforcing material 88 can be applied on top of the adhesive. Alternatively, the layer of reinforcing material 88 can be adhered to the outer surfaces 84, 86 of the foam insulating panels 12, 14 by heating the outer surface of the foam insulating panels slightly above the melting point of the polystyrene and pressing the layer of reinforcing material into the softened plastic material. Preferably, a fiberglass mesh that has a self-adhesive thereon is used for the layer of reinforcing material 88. Such a fiberglass mesh is commercially available under the designation reinforced fiberglass mesh from BASF Wall Systems of Jacksonville, Fla.

Figure 3:
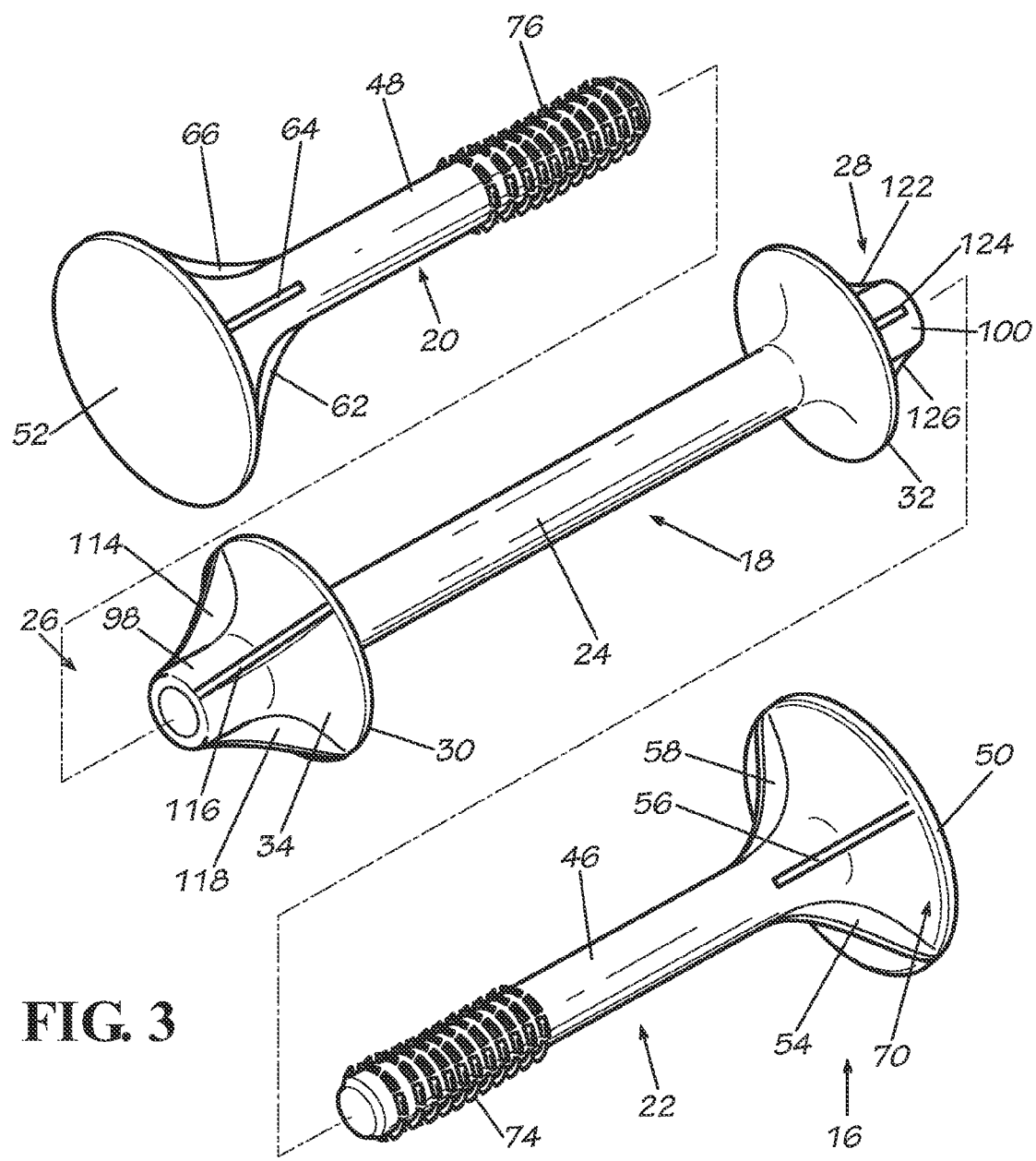
FIG. 3 is an exploded perspective view of a foam insulating panel pin and spacer system in accordance with a disclosed embodiment of the present invention.

The insulated concrete form 10 is prepared by forming holes in the foam insulating panels 12, 14 to receive the first and second pins members 20, 22. Holes in the foam insulating panels 12, 14 can be formed by conventional drilling, such as with a rotating drill bit, water jets or hot knives. When the foam insulating panels 12, 14 include a layer of reinforcing material 88, the layer of reinforcing material is preferably adhered to the foam insulating panels before the holes are formed in those panels. First, in each of the foam insulating panels 12, 14, round holes 90, 92 (FIG. 2) are formed through the thickness of the panels extending from the inner surfaces 80, 82 to the outer surfaces 84, 86. The inner diameter of the holes 90, 92 is the equal to the outer diameter of the shaft portions 46, 48 of the pin members 22, 20 so as to form a tight fit when the pin members are inserted into the holes. Countersunk holes 94, 96 axially aligned with the holes 90, 92, respectively, are formed in the inner surfaces 80, 82 of the foam insulating panels 12, 14, respectively. The countersunk holes 94, 96 have a diameter equal to the diameter of the central rod member 24. Although the annular flanges 30, 32 could be formed on the ends 26, 28 of the central rod member 24, in the embodiment shown in FIGS. 2, 3 and 4, the annular flanges are spaced inwardly a short distance away from the ends of the central rod member so as to form nipples 98, 100 extending longitudinally outwardly from the annular flanges. The depth of the countersunk holes 94, 96; i.e., the distance from the inner surfaces 80, 82 to the bottom of the countersunk holes, is approximately the same as the distance from the annular flanges 30, 32 to the ends 26, 28 of the nipples 98, 100. When the countersunk holes 94, 96 are thusly formed, shoulders 102 (FIG. 7) are formed at the intersection of the countersunk holes and the holes 90, 92, such that when the ends 26, 28 of the panel spacer member 18 are inserted into the countersunk holes, the panel contacting portions 34, 36 of the annular flanges 30, 32 contact the inner surfaces 80, 82 of the foam insulating panels 12, 14 respectively, and the ends 26, 28 of the nipples 98, 100 contact the shoulders 102, 104, respectively. Finally, slots 106, 108, 110 and 112 (FIG. 8) are formed in the foam insulating panels 12, 14 respective, extending radially outwardly from the holes 90, 92, respectively, and spaced circumferentially 90 degrees from each other. The slots 106-112 extend from the outer surfaces 84, 86 of the foam insulating panels 12, 14 to the inner surfaces 80, 82 (FIGS. 7 and 8). Four stiffening wings 114, 116, 118, 120 and 122, 124, 126, 128 extending radially outwardly from each of the nipples 98, 100, respectively, are also formed on each end 26, 28 of the panel spacer member 18 and are spaced circumferentially 90 degrees from each other (FIGS. 3 and 4). The slots 106-112 can be formed by any suitable process, such as by drilling, routing or by cutting with a hot knife. The slots 106-112 are sized and shaped to match the size and shape of the stiffening wings 54-68 of the pin members 20, 22 and the stiffening wings 114-128 of the panel spacer member 18, so that when the shaft members 48, 46 are inserted through the foam insulating panels 12, 14, respectively, the stiffening wings 54-68 are received in the slots 106-112 and the foam insulating panel contacting portions 70, 72 of the enlarged head portions 50, 52 contact the outer surfaces 84, 86 of the foam insulating panels, respectively (FIGS. 2 and 3). Or, in the case where the layer of reinforcing material 88 is adhered to the outer surfaces 84, 86 of the foam insulating panels 12, 14, the foam insulating panel contacting portions 70, 72 of the enlarged head portions 50, 52 will contact the layer of reinforcing material. Similarly, when the nipples 98, 100 are inserted into the countersunk holes 94, 96, the stiffening wings 114-120 are received in the slots 106-112 and the foam insulating panel contacting portions 34, 36 of the flanges 30, 32 contact the inner surfaces 80, 82 of the foam insulating panels 12, 14, respectively (FIGS. 2 and 3).

The insulated concrete form 10 is assembled by inserting the shaft portion 48 of the first pin member 20 through the hole 90 in the first foam insulating panel 12, aligning the stiffening wings 62-68 with the slots 106-112, until the panel contacting portion 72 of the enlarge head portion 52 contacts the outer surface 84 (or the layer of reinforcing material 88, if used) of the first foam insulating panel and the shaft portion extends outwardly from the inner surface 80 of the first foam insulating panel. The stiffening wings 62-68 being received in the slots 106-112 prevents the first pin member 20 from rotating relative to the first panel member 12. The panel spacer member 18 is then attached to the first pin member 20 by inserting the shaft portion 48 protruding from the first form insulating panel 12 into the pin receiving cavity 42 such that the panel contacting portion 34 of the annular flange 30 contacts the inner surface 80 of the first foam insulating panel and the end 26 of the nipple 98 contacts the shoulders 102, aligning the stiffening wings 114-120 with the slots 106-112. Since the wings 114-120 are received in the slots 106-112, rotation of the panel spacer member 18 relative to the first foam insulating panel 12 is prevented. As the shaft portion 48 of the first pin member 20 is inserted into the pin receiving cavity 42, the teeth 76 of the first pin member and the teeth 78 of the pin receiving cavity 42 have sufficient flexibility such that the teeth will slide over each other and permit the shaft portion to be inserted into the pin receiving cavity. When the shaft portion 48 is fully inserted into the pin receiving cavity 42, the teeth 76 of the first pin member 20 and the teeth 78 of the pin receiving cavity 42 mate preventing movement of the shaft portion out of the pin receiving cavity thereby locking the first pin member and the panel spacer member 18 together and capturing the first foam insulating panel 12 between the annular flange 30 on the panel spacer member and the enlarged head portion 52 of the first pin member 20. When the panel contacting surface 34 of the annular flange 30 contacts the inner surface 80 of the first foam insulating panel 12 sufficient addition pressure is applied pushing the first pin member 20 and the panel spacer member 18 together such that the foam of the first foam insulating panel is compressed slightly thereby providing a tight seal between the panel contacting portion 34 and the inner surface 80, between the end 26 of the nipple 98 and the shoulders 102 and between the panel contacting portion 72 and the outer surface 84 (or the reinforcing layer 88, if present) thereby providing a water-proof or substantially water-proof seal.

The second foam insulating panel 14 and the panel spacer member 18 are then brought together such that the nipple 100 of the panel spacer member is inserted into the hole 96 in the second foam insulating panel, aligning the stiffening wings 122-128 with the corresponding slots (not shown) in the second foam insulating panel 14. Since the wings 114-120 are received in the corresponding slots, rotation of the panel spacer member 18 relative to the second foam insulating panel is prevented. The panel contacting portion 36 of the annular flange 32 contacts the inner surface 82 and the end 28 of the nipple 100 contacts the shoulders (not shown) at the intersection of the hole 92 and the hole 96. The shaft portion 46 of the second pin member 22 is then inserted into the hole 92 in the second foam insulating panel 14, aligning the stiffening wings 54-60 with corresponding slots (not shown) in the outer surface 86 of the second foam insulating panel, until the panel contacting portion 70 of the enlarge head portion 50 contacts the outer surface 86 of the second foam insulating panel (or the layer of reinforcing material 88, if used) and the shaft portion of the second pin member is inserted into the pin receiving cavity 44 of the panel spacer member 18. The stiffening wings 54-60 received in the corresponding slots (not shown) prevent the second pin member 22 from rotating relative to the second panel member 12. As the shaft portion 46 of the second pin member 22 is inserted into the pin receiving cavity 44, the teeth 74 of the second pin member and the teeth 80 of the pin receiving cavity 44 have sufficient flexibility such that the teeth will slide over each other and permit the shaft portion to be inserted into the pin receiving cavity. When the shaft portion 46 is fully inserted into the pin receiving cavity 44, the teeth 74 of the second pin member 22 and the teeth 80 of the pin receiving cavity 44 mate preventing movement of the shaft portion out of the pin receiving cavity thereby locking the second pin member and the panel spacer member 18 together and capturing the second foam insulating panel 14 between the annular flange 32 on the panel spacer member and the enlarged head 50 of the second pin member 22. When the panel contacting surface 36 of the annular flange 32 contacts the inner surface 82 of the second foam insulating panel 14 sufficient addition pressure is applied pushing the second pin member 22 and the panel spacer member 18 together such that the foam of the second foam insulating panel is compressed slightly thereby providing a tight seal between the panel contacting portion 36 and the inner surface 82, between the end 28 of the nipple 100 and the shoulders (not shown) at the intersection of the hole 92 and the hole 96 and between the panel contacting portion 70 and the outer surface 86 thereby providing a water-proof or a substantially water-proof seal.

As shown in FIG. 1, a plurality of spacer/pin assemblies 16 are positioned in spaced rows and columns across the width and height of the foam insulating panels 12, 14 (see for example enlarged head portions 50, 50' and 50"). When unhardened concrete is introduced into the concrete receiving space 79, the hydrostatic pressure of the unhardened concrete pushes outwardly on the foam insulating panels 12, 14 and tends to push those panels apart. The spacer/pin assemblies 16 are used to prevent the foam insulating panels 12, 13 from moving apart due to the outwardly directed pressure exerted by the unhardened concrete. The size of the enlarged head portions 50, 52 of the first and second pin members 22, 20 should therefore be as large as practical to provide as much surface area over which to distribute the force resisting the outward movement of the foam insulating panels 12, 14. The size of the enlarged head portions 50, 52 will depend on the thickness of the concrete being poured, the height of the concrete pour, the thickness of the foam insulating panels and the distance between adjacent spacer/pin assemblies 16. However, it is found that enlarged head portions 50, 52 having diameters of approximately 2 to 4 inches, especially approximately 2.5 inches, is useful in the present invention. Furthermore, the spacing between adjacent spacer/pin assemblies 16, such as between enlarged head portions 50, 50' and 50" (FIG. 1), will vary depending on the thickness of the concrete being poured, the height of the concrete pour, the thickness of the foam insulating panels and the diameter of the enlarged head portions 50, 52. However, it is found that a spacing of adjacent spacer/pin assemblies 16 of approximately 6 inch to 12 inch centers, especially 8 inch centers, is useful in the present invention. As indicated above, the thickness of the foam insulating panels is also a factor that must be considered in designing the insulated concrete form in accordance with the present invention and will vary depending on the amount of insulation desired, the thickness of the concrete wall, the height of the concrete pour, the diameter of the enlarged head portions 50, 52 and the distance between adjacent spacer/pin assemblies 16. However, it is found that thicknesses for the foam insulating panels 12, 14 of between approximately 2 and 8 inches, especially about 4 inches, is useful for the present invention. Remarkably, the use of the layer of reinforcing material 88 permits the use of smaller enlarged head portions 50, 52; thinner foam insulating panels 12, 14 and farther spacing between adjacent spacer/pin assemblies 16. It is believed that this results from the force applied to the foam insulating panels at the interface between the enlarged head portions 50, 52 and the outer surface 84, 86, respectively, being distributed over a larger surface of the foam insulating panel through the layer of reinforcing material 88. Without the layer of reinforcing material 88, all of the outward force is focused on the portion of the enlarged head portions 50, 52 that contacts the outer surfaces 84, 86. However, the layer of reinforcing material 88 increases the effective diameter of the enlarged head portions 50, 52 and distributes the force over a larger surface area. The layer of reinforcing material 88 also reduces the possibility of cracking or failure of the outer surfaces 84, 86 of the foam insulating panels at the interface with the enlarged head portions 50, 52. Portions of the layer of reinforcing material 88 will also be embedded in adhesive, as described below, to further strengthen the foam insulating panels 12, 14, to strengthen the attachment of adjacent foam insulating panels and to strengthen the attachment of foam insulating panels to a concrete floor or other support structure.

The layer of reinforcing material 88 also advantageously provides a substrate for attaching decorative surfaces thereto. For example, as shown in FIG. 1, a layer of thin set 150 is applied on top of the fiberglass mesh 88. On top of the layer of thin set (acrylic adhesive) 150 is a layer of textured paint, acrylic finish coat or pigmented stucco material 152. Instead of the layer of texture paint, acrylic finish coat or pigmented stucco material 152, a layer of thin profile brick 154 can be attached to the layer of reinforcing material 88 and second foam insulating panel 14 using a thicker layer of thin set 150. For interior applications, ceramic tile or a layer of gypsum board (sheet rock or dry wall) 156 can be attached to the layer of reinforcing material and the first foam insulating panel 12 using any suitable adhesive, such as Liquid Nails® which is commercially available from Akzo Nobel Paints LLC, Strongsville, Ohio.

Use of the concrete insulated form 10 in accordance with various disclosed embodiments of the present invention will now be considered. In order to form an exterior wall of a building or other structure, or in order to build a structure more than one story high, multiple foam insulating panels must be positioned adjacent like panels and connected together to form an insulated concrete mold of a desired length and/or height. FIGS. 9 and 12 show a pair of rectangular exterior foam insulating panels 200, 202 joined side-by-side at their longitudinal edges. Each of the foam insulation panels 200, 202 has the same shape configuration. The panel 200 has a left longitudinal edge 204, a right longitudinal edge 206, an upper transverse edge 208, a lower transverse edge 210, an outer surface 212 and an inner surface 214. Extending transversely outwardly from the left longitudinal edge 204 is a flange 216. Extending transversely outwardly from the right longitudinal edge 206 is a flange 218. Extending longitudinally outwardly from the upper transverse edge 208 is a flange. 220. Extending longitudinally outwardly from the lower transverse edge 210 is a flange 222. The flange 216 extends longitudinally from the lower transverse edge 210 to the top of the flange 220. The flange 220 extends transversely from the right longitudinal edge 206 to the left edge of the flange 216. The flange 218 extends longitudinally from the upper transverse edge 208 to the bottom edge of the flange 222. The flange 222 extends transversely from the left longitudinal edge 204 to the right edge of the flange 218.

Similarly, the panel 202 has a left longitudinal edge 224, a right longitudinal edge 226, an upper transverse edge 228, a lower transverse edge 230, an outer surface 232 and an inner surface 234. Extending transversely outwardly from the left longitudinal edge 224 is a flange 236. Extending transversely outwardly from the right longitudinal edge 226 is a flange 238. Extending longitudinally outwardly from the upper transverse edge 228 is a flange. 240. Extending longitudinally outwardly from the lower transverse edge 230 is a flange. 242. The flange 236 extends longitudinally from the lower transverse edge 230 to the top of the flange 240. The flange 240 extends transversely from the right longitudinal edge 226 to the left edge of the flange 236. The flange 238 extends longitudinally from the upper transverse edge 228 to the bottom edge of the flange 242. The flange 242 extends transversely from the left longitudinal edge 224 to the right longitudinal edge of the flange 238.

The flanges 218, 222 are essentially an extension of the outer surface 212 of the foam insulating panel 200. Similarly, the flanges 216, 220 are essentially an extension of the inner surface 214 of the foam insulating panel 200. The flanges 238, 242 are essentially an extension of the outer surface 232 of the foam insulating panel 202. Similarly, the flanges 236, 240 are essentially an extension of the inner surface 234 of the foam insulating panel 202.

As best shown in FIG. 12, the flanges 218, 236 have complimentary shapes such that when the longitudinal edges 206, 224 of the foam insulating panels 200, 202, respectively, are joined, as shown in FIG. 9, the flanges 218, 236 mate and form a tight fit, as shown in FIG. 12. The interface between the right longitudinal edge 206 of the foam insulating panel 200 and the flange 236 and the left longitudinal edge 224 of the foam insulating panel 202 and the flange 218 forms a joint. Before the foam insulating panels 200, 202 are jointed together, a water-proof adhesive is applied to the right longitudinal edge 206 and flange 218 of the panel 200 and to the left longitudinal edge 224 and flange 236 of the panel 202. Such adhesive can be applied by any conventional means, such as by brushing, rolling, spraying, spreading, and the like. When the foam insulating panels 200, 202 are joined at their longitudinal edges as shown in FIGS. 9 and 12, the adhesive fills the joint formed there between and render the joint water-proof or substantially water-proof. Any water-proof adhesive suitable for adhering polystyrene to polystyrene can be used. One such adhesive is a spray polyurethane adhesive which is commercially available under the designation Foam-Lok adhesive available from Demand Products of Alpharetta, Ga.

Figure 10:
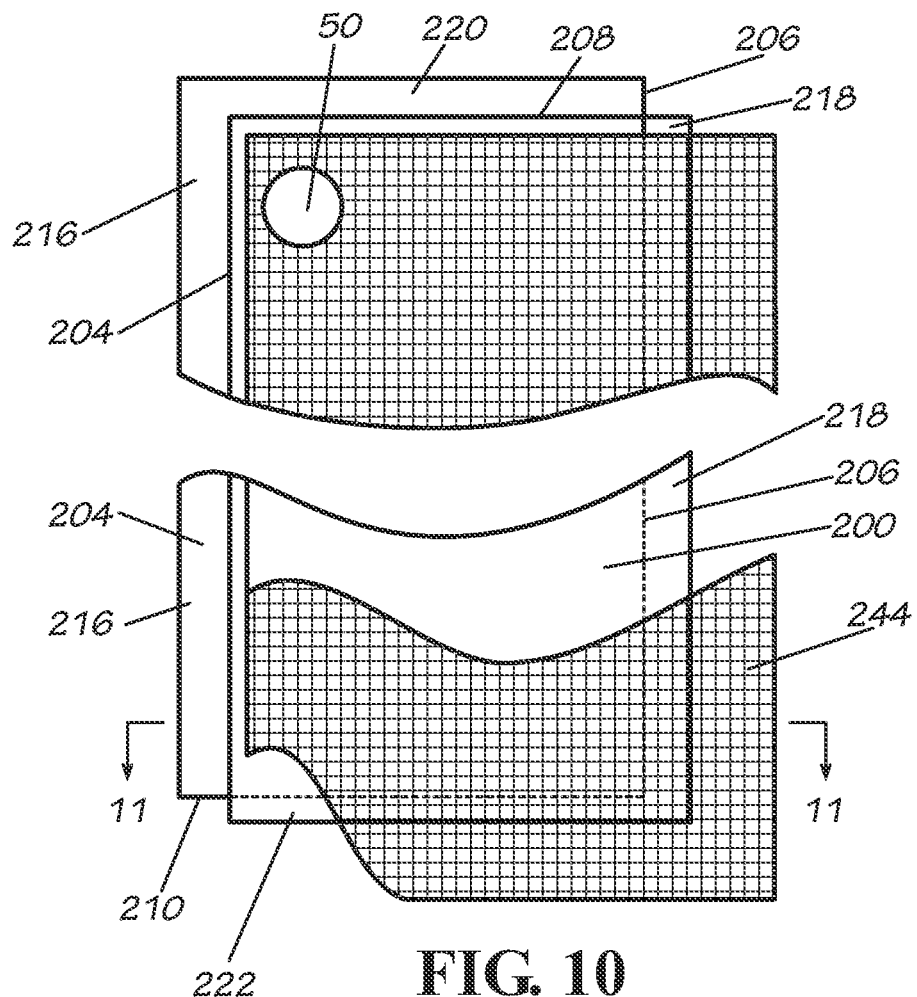
FIG. 10 is a side partial plan view of an exterior foam insulating panel in accordance with a disclosed embodiment of the present invention, showing the use of a layer of reinforcing material on an outer surface of the foam insulating panel and shown with the layer of reinforcing material and portions of the panel partially cut away for clarity and showing only a single pin/spacer assembly for illustration of relative placement. Relative sizes of the flanges have been exaggerated for clarity.

The foam insulating panels 200, 202 are shown in FIG. 9 without a layer of reinforcing material. However, the foam insulating panel 200 shown in FIGS. 10, 11 and 12 has a layer of reinforcing material; namely, a mesh 244 of self-adhesive fiberglass adhered to the outer surface 212 of the panel 200. An identical fiberglass mesh 246 is adhered to the outer surface 232 of the foam insulating panel 202 in the same manner as shown in FIG. 10 with respect to the panel 200. As can be seen in FIG. 10, the fiberglass mesh 244 is substantially coextensive with the left longitudinal edge 204 and the upper transverse edge 208 of the foam insulating panel 200. However, a portion of the fiberglass mesh 244 extends outwardly from and overhangs the right longitudinal flange 218 and the lower transverse flange 222 of the foam insulating panel 200. The portion of the fiberglass mesh 244 overhanging the right longitudinal flange 218 of the foam insulating panel 200 is adhered to the foam insulating panel 202 adjacent the left longitudinal edge 224 thereof. FIG. 12 shows the portion of the fiberglass mesh 244 adhered to the outer surface 212 of the foam insulating panel 200 overlaying and adhered to the portion of the foam insulating panel 202 and the fiberglass mesh 246 adjacent to the left longitudinal edge 224. The self-adhesive of the fiberglass mesh 224 can be used to temporarily attach the overhanging portion of the mesh 224 to the foam insulating panel 202 and fiberglass mesh 246. However it is desirable to apply an additionally coating of adhesive to the portion of the fiberglass mesh 224 contacting the foam insulating panel 202 (and the fiberglass mesh 246 when present). Such adhesive can be applied by any conventional means, such as by brushing, rolling, spraying, spreading, and the like. Any adhesive that is suitable for adhering the portion of the fiberglass mesh 224 contacting the foam insulating panel 202 and the fiberglass mesh 246 can be used. A useful adhesive is a vinyl or acrylic adhesive which is commercially available under the designation Senergy Stuccobond or Senergy EPS insulation adhesive base coat available from BASF Wall Systems of Jacksonville, Fla. The adhesive can be conveniently applied to the portion of the fiberglass mesh 224 contacting the foam insulating panel 202 (and the fiberglass mesh 246 when present) by spraying from an airless spray gun. The amount by which the fiberglass mesh 244 extends beyond the flanges 218, 222 of the foam insulating panel 200 can be any useful amount, such as about 1 to about 6 inches.

As stated above, the foam insulating panels, such as 12, 14, 200 and 202, are designed to extend from the floor to the height of the ceiling or next floor slab in a single sheet expanded polystyrene. However, when it is desired to construct a building or other structure that is more than one story high, it is necessary to vertically stack multiple foam insulating panels, one for each floor of the building (however, it should be understood that this is only done one story at a time). FIGS. 14-17 show how the foam insulating panels of an exterior wall can be vertically stacked. A foam insulating panel 248 of the identical construction as the foam insulating panel 200 is stacked vertically on top of the panel 200. The foam insulating panel 248 has a lower transverse edge 250, a left longitudinal edge 252, an upper transverse edge 253, a right transverse edge 254, an outer surface 256 and an inner surface 258. Extending transversely outwardly from the left longitudinal edge 252 is a flange 260. Extending transversely outwardly from the right longitudinal edge 254 is a flange 262. Extending longitudinally outwardly from the upper transverse edge 253 is an upper flange 263. Extending longitudinally outwardly from the lower transverse edge 250 is a flange. 264. The flange 260 extends longitudinally from the lower transverse edge 250 to the top of the upper flange 263. The upper flange 263 extends transversely from the right longitudinal edge 254 to the left edge of the flange 260. The flange 262 extends longitudinally from the upper transverse edge 253 to the bottom edge of the flange 264. The flange 264 extends from the left longitudinal edge 252 to the right edge of the flange 262. The flanges 262, 264 are essentially an extension of the outer surface 256 of the foam insulating panel 248. Similarly, the flanges 260, 263 are essentially an extension of the inner surface 258 of the foam insulating panel 248.

Figure 16:
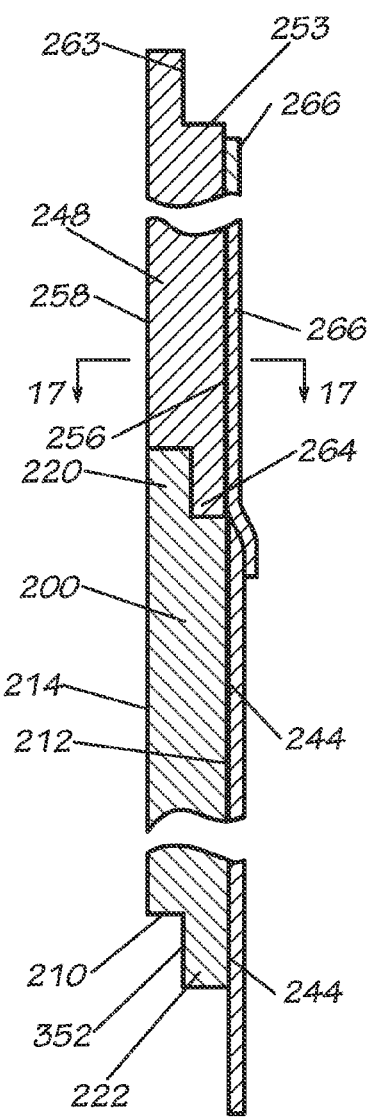
FIG. 16 is a partial cross-sectional view taken along the line 16-16 of the foam insulating panels shown in FIG. 14. Relative sizes of the flanges have been exaggerated for clarity. Pin/spacer assemblies are also not shown for clarity.

As best shown in FIG. 16, the flanges 220, 264 have complimentary shapes such that when the transverse edges 208, 250 of the foam insulating panels 200, 248 are joined, as shown in FIG. 14, the flanges 220, 264 mate and form a tight fit, as shown in FIG. 16. The interface between the upper transverse edge 208 of the foam insulating panel 200 and the flange 220 and the lower transverse edge 250 of the foam insulating panel 248 and the flange 264 forms a joint. Before the foam insulating panels 200, 248 are jointed together, a water-proof adhesive is applied to the upper transverse edge 208 and flange 220 of the panel 200 and to the lower transverse edge 250 and flange 264 of the panel 248. Such adhesive can be applied by any conventional means, such as by brushing, rolling, spraying, spreading, and the like. When the foam insulating panels 200, 248 are joined at their transverse edges as shown in FIGS. 14 and 16, the adhesive fills the joint formed there between and render the joint water-proof or substantially water-proof. Any water-proof adhesive suitable for adhering polystyrene to polystyrene can be used. A useful adhesive is a vinyl or acrylic adhesive which is commercially available under the designation Senergy Stuccobond or Senergy EPS insulation adhesive base coat.

Figure 11:
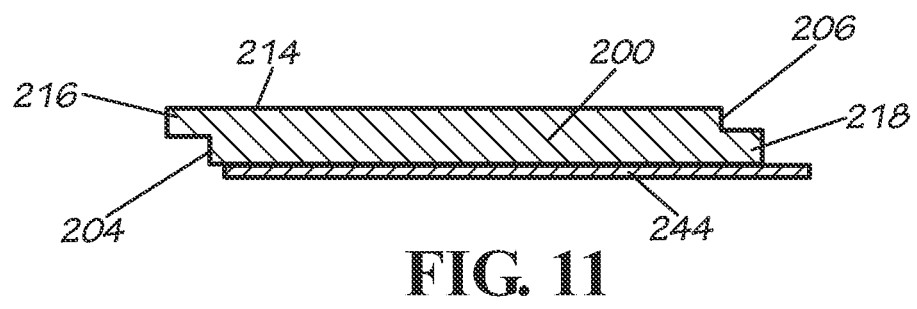
FIG. 11 is a cross-sectional view taken along the line 11-11 of the foam insulating panel shown in FIG. 10. Relative sizes of the flanges have been exaggerated for clarity. Pin/spacer assemblies are also not shown for clarity.
Figure 15:
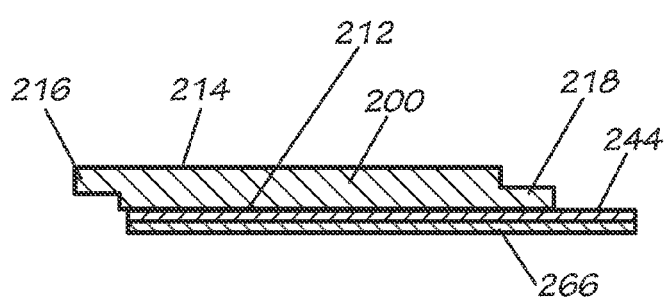
FIG. 15 is a cross-sectional view taken along the line 15-15 of the foam insulating panels shown in FIG. 14. Relative sizes of the flanges have been exaggerated for clarity. Pin/spacer assemblies are also not shown for clarity.
Figure 17:
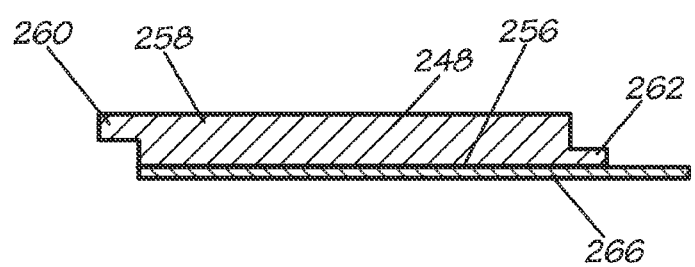
FIG. 17 is a cross-sectional view taken along the line 17-17 of the foam insulating panels shown in FIG. 16. Relative sizes of the flanges have been exaggerated for clarity. Pin/spacer assemblies are also not shown for clarity.

The foam insulating panels 200, 248 are shown in FIGS. 14-17 with layers of reinforcing material 244, 266. The foam insulating panel 200, as shown in FIGS. 10, 11 and 14, show a layer of reinforcing material; namely, a mesh 244 of self-adhesive fiberglass adhered to the outer surface 212 of the panel 200. An identical fiberglass mesh 266 (FIGS. 14-17) is adhered to the outer surface 256 of the foam insulating panel 248 in the same relative configuration as shown in FIG. 10 with respect to the panel 200. As can be seen in FIGS. 14-17, the fiberglass mesh 266 is substantially coextensive with the left longitudinal edge 252 and the upper transverse edge 253 of the foam insulating panel 248. However, a portion of the fiberglass mesh 266 extends beyond and overhangs the right longitudinal flange 262 and the lower transverse flange 264 of the foam insulating panel 248. The portion of the fiberglass mesh 266 overhanging the lower transverse flange 264 of the foam insulating panel 248 is adhered to outer surface 212 of the foam insulating panel 200 and a portion of the fiberglass mesh 244 adhered thereto adjacent the upper transverse edge 208 thereof. FIGS. 15 and 16 show the portion of the fiberglass mesh 266 adhered to the outer surface 256 of the foam insulating panel 248 overlaying and adhered to the portion of the foam insulating panel 200 and the fiberglass mesh 244 adjacent the upper transverse edge 208. The self-adhesive of the fiberglass mesh 266 can be used to temporarily attach the overhanging portion of the mesh 266 to the outer surface 212 and fiberglass mesh 244 of the foam insulating panel 200. However it is desirable to apply an additionally coating of adhesive to the portion of the fiberglass mesh 266 contacting the foam insulating panel 200 and the fiberglass mesh 244. Such adhesive can be applied by any conventional means, such as by brushing, rolling, spraying, spreading, and the like. Any adhesive that is suitable for adhering the portion of the fiberglass mesh 266 contacting the foam insulating panel 200 and the fiberglass mesh 244 can be used. A useful adhesive is a vinyl or acrylic adhesive which is commercially available under the designation Senergy Stuccobond or Senergy EPS insulation adhesive base coat. The adhesive can be conveniently applied to the portion of the fiberglass mesh 266 contacting the foam insulating panel 200 and the fiberglass mesh 244 by spraying from an airless spray gun.

Figure 20:
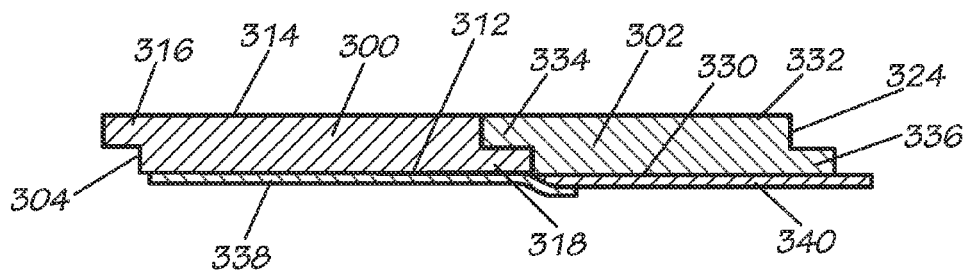
FIG. 20 is a cross-sectional view taken along the line 20-20 of the foam insulating panels shown in FIG. 18. Relative sizes of the flanges have been exaggerated for clarity. Pin/spacer assemblies are also not shown for clarity.
Figure 21:
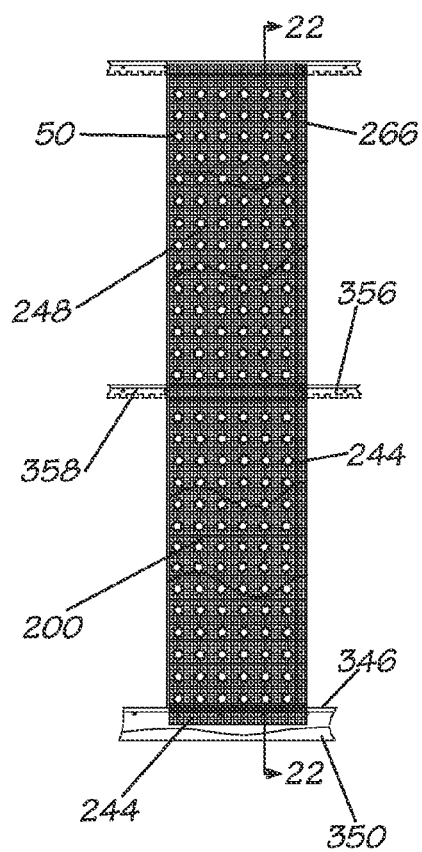
FIG. 21 is a partial front plan view of a multi-story building using an insulated concrete form in accordance with a disclosed embodiment of the present invention.
Figure 22:
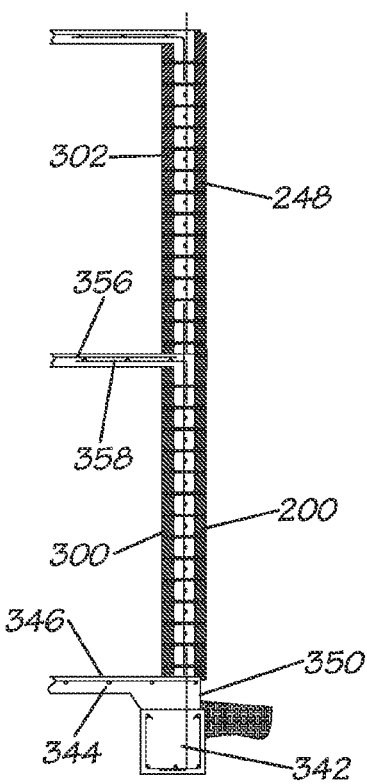
FIG. 22 is a partial side plan view of the multi-story building and the insulated concrete form shown in FIG. 21.
Figure 23:
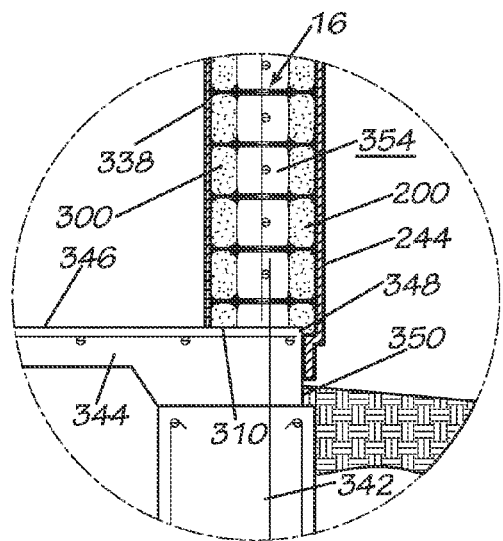
FIG. 23 is a partial detailed side view of the multi-story building and insulated concrete form shown in FIG. 22, showing the interface of the insulated concrete form and the concrete floor of the first story of the building.
Figure 25:
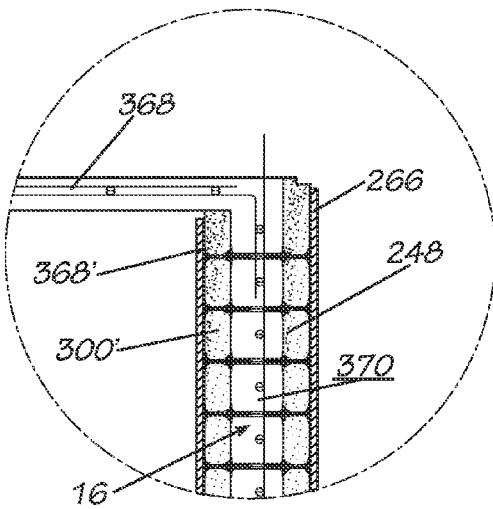
FIG. 25 is a partial detailed side view of the multi-story building and insulated concrete form shown in FIG. 22, showing the interface of the insulated concrete form and the concrete floor of the third story of the building.

FIGS. 18-20 show a pair of rectangular interior foam insulating panels 300, 302 joined side-by-side at their longitudinal edges. Each of the foam insulation panels 300, 302 has the same shape configuration. The panel 300 has a left longitudinal edge 304, a right longitudinal edge 306, an upper transverse edge 308, a lower transverse edge 310, an outer surface 312 and an inner surface 314. Extending transversely outwardly from the left longitudinal edge 304 is a flange 316. Extending transversely outwardly from the right longitudinal edge 306 is a flange 318. The flange 316 extends longitudinally from the lower transverse edge 310 to the upper transverse edge 308. The flange 318 extends longitudinally from the upper transverse edge 308 to the lower transverse edge 310. Similarly, the panel 302 has a left longitudinal edge 320, a right longitudinal edge 324, an upper transverse edge 326, a lower transverse edge 328, an outer surface 330 and an inner surface 332. Extending transversely outwardly from the left longitudinal edge 320 is a flange 334. Extending transversely outwardly from the right longitudinal edge 324 is a flange 336. The flange 334 extends longitudinally from the lower transverse edge 328 to the upper transverse edge 326. The flange 336 extends longitudinally from the upper transverse edge 326 to the lower transverse edge 328.

The foam insulating panels 300, 302 are shown in FIGS. 18-20 each with a layer of reinforcing material. Specifically, the foam insulating panel 300 is shown with a layer of reinforcing material; namely, a mesh 338 of self-adhesive fiberglass adhered to the outer surface 312 of the panel 300. An identical fiberglass mesh 340 is adhered to the outer surface 330 of the foam insulating panel 302 in the same manner as shown in FIG. 18 with respect to the panel 300. As can be seen in FIGS. 18-20, the fiberglass mesh 338 is substantially coextensive with the left longitudinal edge 304, the upper transverse edge 308 and the lower transverse edge 310 of the foam insulating panel 300. However, a portion of the fiberglass mesh 338 extends beyond and overhangs the flange 318 of the foam insulating panel 300. Similarly, the fiberglass mesh 340 is substantially coextensive with the left longitudinal edge 320, the upper transverse edge 326 and the lower transverse edge 328 of the foam insulating panel 302. However, a portion of the fiberglass mesh 340 extends beyond and overhangs the flange 336 of the foam insulating panel 302.

The portion of the fiberglass mesh 338 overhanging the flange 318 of the foam insulating panel 300 is adhered to the foam insulating panel 302 and fiberglass mesh 326 adjacent the left longitudinal edge 320 thereof. FIGS. 18-20 show the portion of the fiberglass mesh 338 adhered to the outer surface 312 of the foam insulating panel 300 overlaying and adhered to the portion of the foam insulating panel 302 and fiberglass mesh 340 adjacent the longitudinal edge 320. The self-adhesive of the fiberglass mesh 338 can be used to temporarily attach the overhanging portion of the mesh 338 to the foam insulating panel 302 and fiberglass mesh 340. However it is desirable to apply an additionally coating of adhesive to the portion of the fiberglass mesh 338 contacting the foam insulating panel 302 and the fiberglass mesh 340. Such adhesive can be applied by any conventional means, such as by brushing, rolling, spraying, spreading, and the like. Any adhesive that is suitable for adhering the portion of the fiberglass mesh 338 contacting the foam insulating panel 302 and the fiberglass mesh 340 can be used. A useful adhesive is Fastbond by the 3M Company, St. Paul, Minn. The adhesive can be conveniently applied to the portion of the fiberglass mesh 338 contacting the foam insulating panel 302 and the fiberglass mesh 340 by spraying from an airless spray gun.

FIGS. 21-25 show the use of a disclosed embodiment of the insulated concrete forms of the present invention in the construction of a multi-story building. The building has a concrete footing 342 which supports a concrete slab 344. The concrete slab 344 is the floor of the first or ground floor story of the multi-story building. The concrete slab 344 has an upper horizontal surface 346, an exterior edge 348 and an exterior vertical face 350. The footing 342 and concrete slab 344 typically include steel reinforcement, such as a mesh of steel rebar.

Sitting on the upper surface 346 of the concrete slab 344 is an insulated concrete form in accordance with a disclosed embodiment of the present invention. The insulated concrete form comprises the exterior foam insulating panel 200 and the interior foam insulating panel 300. The flange 222 of the foam insulating panel 200 has an inner face 352 (FIG. 16). The exterior foam insulating panel 200 sits on the upper surface 346 of the concrete slab 344 adjacent the exterior edge 348 thereof such that the inner face 352 of the flange 222 contacts the exterior vertical face 350 of the concrete slab and the lower transverse edge 210 of the foam insulating panel 200 contacts the upper surface 346 of the concrete slab. Spaced from the exterior foam insulating panel 200 is the interior foam insulating panel 300. The interior foam insulating panel 300 sits on the concrete slab 344 such that the lower transverse edge 310 contacts the upper surface 346 of the concrete slab. A plurality of spacer/pin assemblies 16 maintain the foam insulating panels 200, 300 in their spaced relationship in the same manner as shown in FIGS. 1 and 2.

The foam insulating panels 200, 300 and the concrete slab 344 define a concrete receiving space 354 for receiving unhardened concrete. In order to allow unhardened concrete in the concrete receiving space 354 to achieve its maximum hardness, it is desirable to retain as much of the water portion of the unhardened concrete in the concrete receiving space. The interface between the upper surface 346 of the concrete slab 344 and the foam insulating panels 200, 300 forms a joint through which water from unhardened concrete in the concrete receiving space 354 can leak out of the concrete receiving space. Therefore, it is specifically contemplated that the joints between the upper surface 346 of the concrete slab 344 and the foam insulating panels 200, 300 should be made water-proof or substantially water-proof. Therefore, before the exterior foam insulating panel 200 is placed on the concrete slab 344, a water-proof adhesive is applied to the inner face 352 of the flange 222 and to the lower transverse edge 210 of the exterior foam insulating panel. Such adhesive can be applied by any conventional means, such as by brushing, rolling, spraying, spreading, and the like. Therefore, when the exterior foam insulating panel 200 is placed on the concrete slab 344, the adhesive on the flange 222 and the lower transverse edge 210 seals to joint formed between the panel and the concrete slab thereby rendering the joint water-proof or substantially water-proof. The adhesive also adheres the exterior foam insulating panel 200 to the concrete slab. Similarly, before the interior foam insulating panel 300 is placed on the concrete slab 344, a water-proof adhesive is applied to the lower transverse edge 310 of the interior foam insulating panel. Such adhesive can be applied by any conventional means, such as by brushing, rolling, spreading, and the like. Therefore, when the interior foam insulating panel 300 is placed on the concrete slab 344, the adhesive on the lower transverse edge 310 seals to joint formed between the panel and the concrete slab thereby rendering the joint water-proof or substantially water-proof. The adhesive also adheres the interior foam insulating panel 300 to the concrete slab. Any water-proof adhesive that is suitable for adhering polystyrene to concrete can be used. A useful adhesive is Senergy EPS insulation adhesive base coat by BASF Wall Systems. For adhering the foam insulating panels 200, 300 to the concrete slab 344, it is desirable to add Portland cement to the Senergy EPS insulation adhesive base coat in the ratio of approximately 1:1.

In order to further secure the foam insulating panel 200 to the concrete slab 344 and to prevent uplift by the force of the fluid unhardened concrete, the layer of reinforcing material on the outer surface of the exterior foam insulating panels is adhered to the concrete slab. Specifically, the portion of the fiberglass mesh 244 extending beyond to lower transverse flange 222 of the exterior foam insulating panel 200 is adhered to the exterior vertical face 350 of the concrete slab 344. An adhesive is applied to the end of the flange 222 and to the exterior vertical face 350 and to the portion of the fiberglass mesh 244 extending beyond to lower transverse flange 222 of the exterior foam insulating panel 200. The portion of the fiberglass mesh 244 extending beyond to lower transverse flange 222 of the exterior foam insulating panel 200 is then wrapped over the end of the flange 222 and brought into contact with the exterior vertical face 350 of the concrete slab 344. Any adhesive that is suitable for adhering fiberglass to concrete can be used. A useful adhesive is Senergy EPS insulation adhesive base coat by BASF Wall Systems. For adhering the fiberglass mesh 244 to the concrete slab 344, it is desirable to add Portland cement to the Senergy EPS insulation adhesive base coat in the ratio of approximately 1:1. Such adhesive can be applied by any conventional means, such as by spreading, and the like.

In order to further stabilize the interior foam insulating panel 300 from movement, a conventional knee bracing system (not shown) is used.

Figure 24:
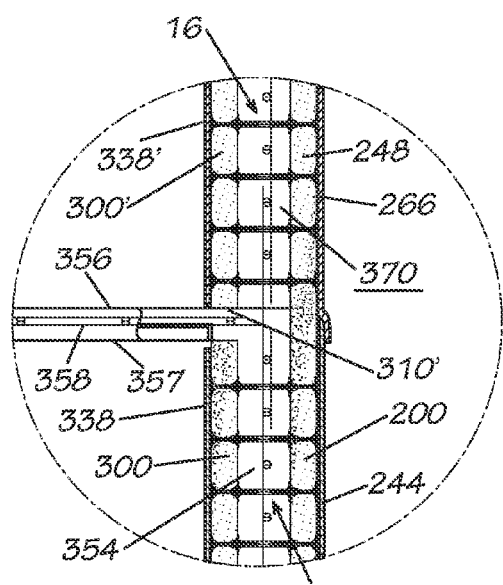
FIG. 24 is a partial detailed side view of the multi-story building and insulated concrete form shown in FIG. 22, showing the interface of the insulated concrete form and the concrete floor of the second story of the building.

As can be seen in FIGS. 21-24, the exterior foam insulating panel 200 extends from the horizontal surface 346 of the concrete slab 344 (FIG. 23) to a top surface 356 of an upper concrete slab 358 (FIG. 24). However, the interior foam insulating panel 300 extends from the horizontal surface 346 of the concrete slab 344 (FIG. 23) to a bottom surface 357 of the upper concrete slab 358 (FIG. 24). The concrete slab 358 forms the ceiling of the first story of the multi-story building and also forms the floor of the second story of the building.

Figure 26:
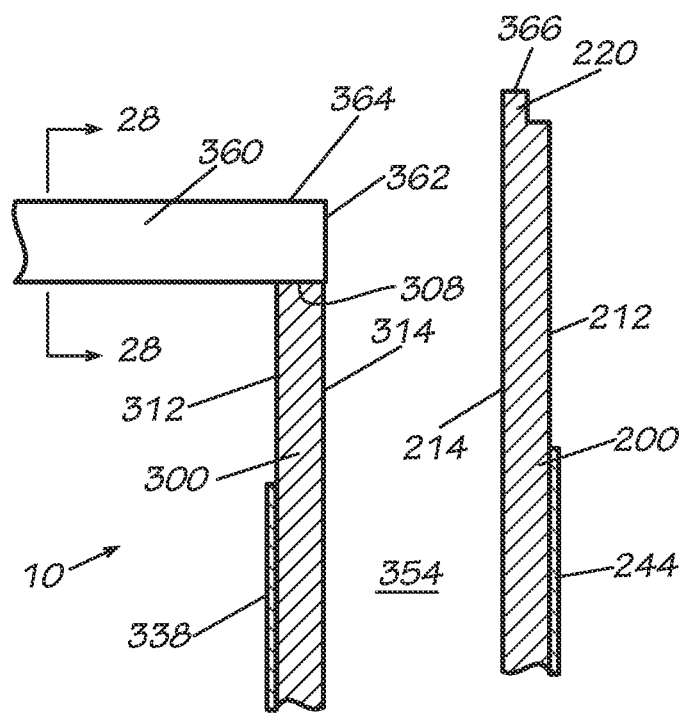
FIG. 26 is a partial detailed side plan view of an insulated concrete form and a concrete deck form in accordance with a disclosed embodiment of the present invention.
Figure 27:
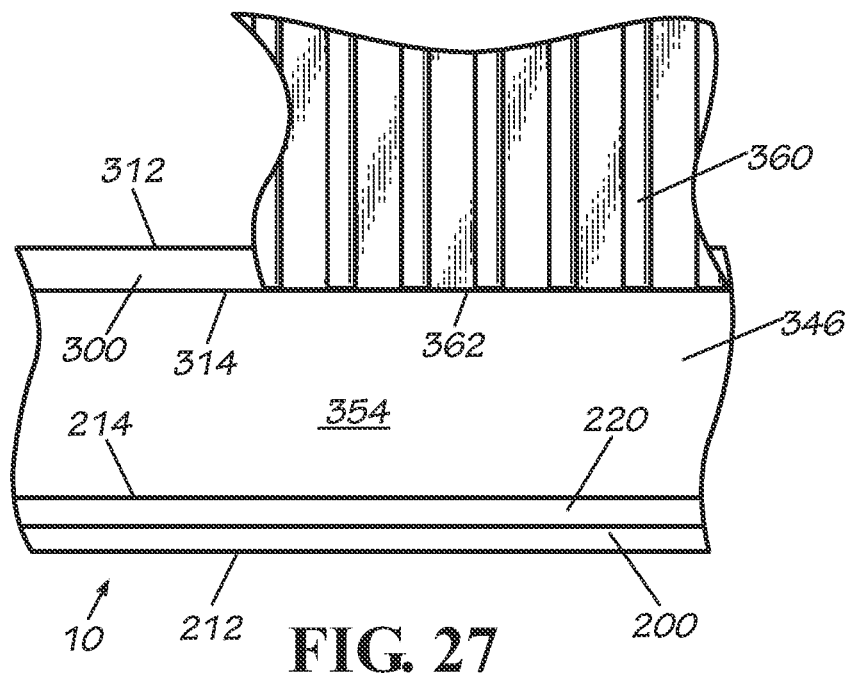
FIG. 27 is a partial detailed top plan view of the insulated concrete form and concrete deck form shown in FIG. 26.
Figure 28:
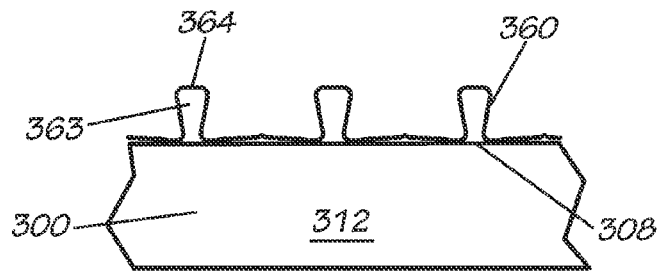
FIG. 28 is a partial detailed front plan view of the interior panel of the insulated concrete form and concrete deck form shown in FIG. 26.

With reference to FIGS. 26, 27 and 28, the concrete slab 358 is formed using a conventional concrete deck form 360, such as a corrugated steel deck form. The concrete deck form has an open end 362 and a open top 364. The concrete deck form 360 sits on top the upper transverse edge 308 of the interior foam insulating panel 300. The weight of the concrete deck form 360 is supported by conventional concrete deck form support members (not shown), but it should be noted that the interior foam panel 300 is not a weight bearing support member for the concrete deck form 360. The end 362 of the concrete deck form 360 is a terminator end and not only fits flush with the inner surface 314 of the interior foam insulating panel 300 but also provides a flat bottom that contacts the upper transverse edge 308 of the interior foam insulating panel 300. The top 366 of the flange 220 of the exterior foam insulating panel 200 extend above the height of the top 364 of the concrete deck form 360. When unhardened concrete is introduced into the concrete receiving space 354, it is filled to the same height as the top 366 of the flange 220 of the exterior foam insulating panel 200. Thus, the upper surface 356 of the upper concrete slab 358 is equal to the height of the top 366 of the flange 220 of the exterior foam insulating panel 200 and above the height of the top 364 of the deck form 360.

Since the interface between the bottom of the terminator end 362 of the concrete deck form 360 and the upper transverse edge 308 of the interior foam insulating panel 300 forms a joint through which water can leak (FIG. 26), a water-proof or substantially water-proof adhesive is applied to the bottom of the terminator end of the concrete deck form before it is positioned on the upper transverse edge of the interior foam insulating panel. When the terminator end 362 of the concrete deck form 360 is positioned on top of the upper transverse edge 308 of the interior foam insulating panel 300, the adhesive fills the joint formed there between and renders the joint water-proof or substantially water-proof. Any adhesive that is suitable for adhering steel to polystyrene can be used. A useful adhesive is a polyurethane foam, which is commercially available under the designation Expanded Foam Sealant available from Hilti of Oklahoma City, Okla. Such adhesive can be applied by any conventional means, such as by spraying, spreading, and the like. If a terminator end 362 is not used with the deck form 360, the spaces 363 between the deck form 360 and the upper transverse edge 308 of the interior foam insulating panel 300 can be filled by spraying an expanding polyurethane foam into the open spaces.

Additional exterior foam insulating panel members, such as the foam insulating panel 202, are positioned adjacent the exterior foam insulating panel 200 so as to form an exterior insulated concrete form of a desired length. The exterior foam insulating panel 202 is adhered to the foam insulating panel 200 in the manner previously described. Furthermore, the flange 242 and the fiberglass mesh 246 on the exterior foam insulating panel 202 are adhered to the exterior vertical face 350 of the concrete slab 346 in the same manner as described with respect to the flange 222 and the fiberglass mesh 244 of the exterior foam insulating panel 200. Additionally, the fiberglass mesh 244 of the exterior foam insulating panel 200 is adhered to the outer surface 232 and fiberglass mesh 246 of the exterior foam insulating panel 202 adjacent the left longitudinal edge 224 in the same manner as described above. Similarly, additional interior foam insulating panel members, such as the foam insulating panel 302, are positioned adjacent the interior foam insulating panel 300 so as to form an interior insulated concrete form of a desired length. The interior foam insulating panel 302 is adhered to the foam insulating panel 300 in the same manner previously described. Furthermore, the lower transverse edge 328 of the exterior foam insulating panel 302 is adhered to the horizontal surface 346 of the concrete slab 346 in the same manner as described with respect to the lower transverse edge 310 of the interior foam insulating panel 300. Additionally, the fiberglass mesh 338 of the interior foam insulating panel 300 is adhered to the outer surface 330 and fiberglass mesh 340 of the interior foam insulating panel 302 adjacent the left longitudinal edge 320 in the same manner as described above. Lastly, additional concrete deck forms 360 are positioned on top of the interior foam insulating panel 302 in the same manner as described above with respect to the interior foam insulating panel 300 and as shown in FIG. 26. And, adhesive is applied to the bottom of the terminator end 362 of the concrete deck form 360 before it is placed upon the upper transverse edge 326 of the interior foam insulating panel 302.

The insulated concrete forms are then ready to be filled with concrete. The foam insulating panels 200, 202, 300, 302 are selected to be of a thickness sufficiently strong to bear the weight of the unhardened concrete which they will contain. Nevertheless, it is advisable to fill the concrete forms gradually from the bottom to the top with an unhardened concrete mix, preferably in multiple portions. Therefore, the forms should be filled gradually with the concrete mix introduced into the concrete receiving space 354 such that when the insulated concrete forms 10 are full, the hydraulic pressure is not sufficient to rupture or otherwise substantially deform the foam insulating panels 200, 202, 300, 302. Furthermore, the amount and type of accelerator in the concrete mix and the amount of time to fill the concrete receiving space 354 should be such that cold joint are not formed between the layers of concrete mix of a first portion of the concrete mix and a second portion. Additional portions of concrete mix are added to the insulated concrete forms 10 until the concrete receiving space 354 is filled from the horizontal surface 346 of the concrete slab 344 to the top 366 of the flange 222 of the exterior foam insulating panel 200. By filling the insulated concrete forms 10 in this manner, the upper concrete slab 358 is formed at the same time as the vertical concrete wall is formed by the unhardened concrete in the concrete receiving space 354. It is believed that this is the only insulated concrete form system that can form both a vertical concrete wall and an attached upper concrete deck at the same time and without any cold joints in the wall or between the wall and the deck. Furthermore, since the concrete receiving space 354 is water tight or substantially water tight; i.e., all possible joints and holes have been sealed such that they are water proof or substantially water-proof, the water portion of the concrete mix is retained within the concrete receiving space, and, therefore, retained in the concrete mix. By retaining the water in the concrete mix in the concrete receiving space 354 and by that space being insulated by the foam insulating panels 200, 202, 300, 302, the concrete mix will achieve its maximum potential hardness, thereby producing a stronger concrete wall and concrete deck. In addition, the absence of cold joints in the concrete wall and between the concrete wall and the concrete deck also produces a stronger concrete wall and concrete deck.

After the concrete mix in the concrete receiving space 354 and in the concrete deck form 360 have hardened sufficiently, the second story of the multi-story building can be erected. This is done by placing the exterior foam insulating panel 248 on top of the exterior foam insulating panel 200 and an interior foam insulating panel 300', which is identical to the foam insulating panel 300, on the upper surface 356 of the upper concrete slab 358 in the manner described above and as shown in FIGS. 14, 15, 16, 17 and 24. Of course, adhesive is applied to the flange 220 and upper transverse edge 208 of the exterior foam insulating panel 200 and to the flange 264 and lower transverse edge 250 of the exterior foam insulating panel 248 before they are joined together, as described previously. The portion of the fiberglass mesh 266 that extends beyond the lower transverse flange 264 of the foam insulating panel 248 is then adhered to the outer surface 212 and fiberglass mesh 244 of the foam insulating panel 200 adjacent the upper transverse edge 208 in the manner described above. Similarly, adhesive is applied to the lower transverse edge 310' of the foam insulating panel 300' before it contacts the upper surface 356 of the upper concrete slab 358 in the same manner as described above for the foam insulating panel 300 and the surface 346 of the concrete slab 344. To form an insulated concrete form of a desired length, additional foam insulating panels are attached to the foam insulating panels 248, 300' and to adjacent panels in the same manner as described previously with respect to the foam insulating panels 200, 202, 300, 302 of the first story of the multi-story building. A concrete slab 368 can be formed in the same manner as previously described with respect to the upper concrete slab 358 and the foam insulating panels 200, 300. A concrete mix is then added to a concrete receiving space 370 defined by the foam insulating panels 248, 300'. The concrete mix is added to the concrete receiving space 370 in the same manner as previously described. Additional stories can be formed by repeating the process of forming the vertical concrete wall and horizontal concrete slab, as described above.

Although it is possible to vibrate the concrete mix added to the concrete receiving spaces 354, 370, it is preferred to provide additives to the concrete mix to make it self-compacting. Such additives are known in the art.

While the disclosed embodiment of the present invention shown in FIGS. 21, 22, 23, 24 and 25 show the use of both horizontal and vertical steel rebar, it is preferred that the concrete be reinforced with metal fibers, such as steel fibers. Many different types of steel fibers are known and can be used in the present invention, such as those disclosed in U.S. Pat. Nos. 6,235,108; 7,419,543 and 7,641,731, the disclosures of which are incorporated herein by reference in their entireties. If steel rebar is desired, a framework of steel rebar can be formed in the concrete receiving spaces 354, 370 by not attaching the exterior foam insulating panel, such as the panel 14 (FIG. 2), to the panel spacer member 18. Thus, the insulated concrete form would comprise the first pin member 20, the interior foam insulating panel 12 and the panel spacer member 18. The rebar framework could be built in the concrete receiving space 79 using the panel spacer members 18 as support therefore. After the rebar framework is constructed, the exterior foam insulating panel 14 and second pin member 22 can be attached to the panel spacer member 18 in the manner described above.

Alternate embodiments of the spacer/pin assemblies 16 are also disclosed herein. With reference to FIGS. 29, 30, 31 and 32, there is shown an alternate disclosed embodiment of the spacer/pin assembly 16. FIGS. 29, 30, 31 and 32 show a spacer/pin assembly 400. The spacer/pin assembly 400 is preferably formed from a polymeric material, such as polyethylene, polypropylene, nylon or the like, and can be formed by any suitable process, such as by injection molding.

The spacer/pin assemblies 400 include three separate pieces: a panel spacer member 402, a first pin member 404 and a second pin member 406. The panel spacer member 402 includes an elongate central rod member 408. The central rod member 408 can be any suitable shape, but in this embodiment is shown as having a generally circular cross-sectional shape. Formed adjacent each end 410, 412 of the central rod member 408 are annular flanges 414, 416 that extend radially outwardly from the central rod member. Each of the annular flanges 414, 416 includes a generally flat foam insulating panel contacting portion 418, 420, respectively. Formed in each end 410, 412 of the panel spacer member 402 are axially aligned bores 422, 424, respectively (FIG. 30). The axially aligned bores 422, 424 provide pin receiving cavities 426, 428, respectively, which extend inwardly toward the midpoint of the elongate central rod member 408. The pin receiving cavities 426, 428 are generally "+" or cross-shaped in cross-sectional shape; i.e., the pin receiving cavities each have four legs 430, 432, 434 and 438 extending radially outwardly from the central longitudinal axis of the spacer member 402. Formed inside each leg 430, 432, 434 and 438 of each of the pin receiving cavities 426, 428 are a plurality of latch members 440 (FIGS. 30, 31). The latch members 440 each include a resilient finger 442 (FIG. 32).

Figure 34:
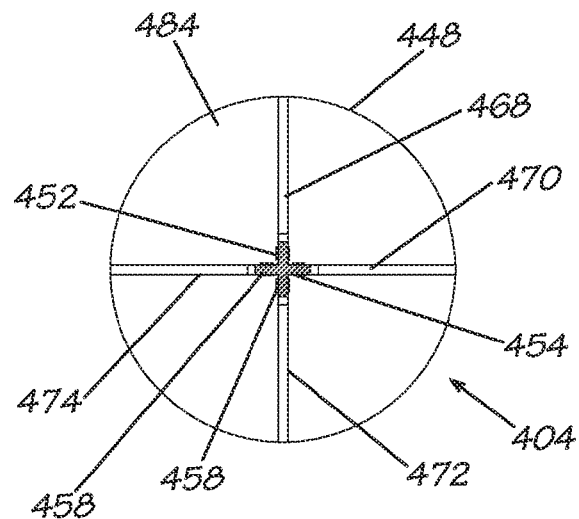
FIG. 34 is an end view of the pin member shown in FIG. 33.
Figure 35:
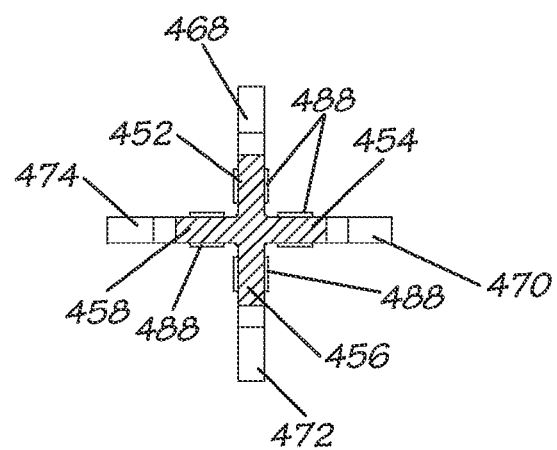
FIG. 35 is a partial detail end view of the pin member shown in FIG. 33.

The first and second pin members 404, 406 each include an elongate shaft portion 444, 446, respectively and enlarged head portions 448, 450. The elongate shaft portions 444, 446 are each generally are generally "+" or cross-shaped in cross-sectional shape; i.e., the shaft portions 444, 446 each have four legs 452, 454, 456, 458 and 460, 462, 464, 466 extending radially outwardly from the central longitudinal axis of the shaft portion. The enlarged head portions 448, 450 are each generally of a flat disk shape and each includes four stiffening wings 468, 470, 472, 474 and 476, 478, 480, 482 (FIGS. 29 and 34), respectively, extending from the enlarged head portions to the elongate shaft portions 444, 446 and are spaced evenly around the circumference of the enlarged head portions. The stiffening wings 468-480 provide extra strength to the enlarged head portions 448, 450 of the first and second pin members 404, 406. Each of the enlarged head portions 448, 450 includes a generally flat foam insulating panel contacting portion 484, 486, respectively, adjacent it circumferential edge. Formed on each of the legs 452, 454, 456, 458 and 460, 462, 464, 466 of each of the shaft portions 444, 446, respectively are a plurality of teeth 488, 490. The teeth 488, 490 are angled toward the enlarged head portions 448, 450, respectively. Teeth 488, 490 are sized and shaped to mate with the resilient latch finger 442 of the latch members 440 formed on the inner surface of the pin receiving cavities 426, 428; i.e., in each of the legs 452-458, 460-466. The outer dimensions of the shaft portions 444, 446 and the inner dimensions of the pin receiving cavities 426, 428 are such that the shaft portions can be inserted into the pin receiving cavities. Furthermore, the material from which the fingers 442 are made are such that the fingers will deflect radially outwardly and will slide over the teeth 488 to allow the shaft portions 444, 446 to be inserted into the pin receiving cavities 426, 428. However, after the shaft portions 444, 446 are inserted into the pin receiving cavities 426, 428, the fingers 442 catch on the teeth 488, 490 and prevent removal of the shaft portions from the pin receiving cavities. The fingers 442 and teeth 488, 490 therefore act as a pawl and a ratchet permitting movement in one direction, but not in another. The teeth 488, 490 and fingers 442 therefore provide a one-way locking mechanism; i.e., the first and second pin members 404, 406 can be relatively easily inserted into the panel spacer member 402, but once inserted, the pin members are locked in place and cannot be removed from the panel spacer member under normal, expected pressure loads.

Figure 29:
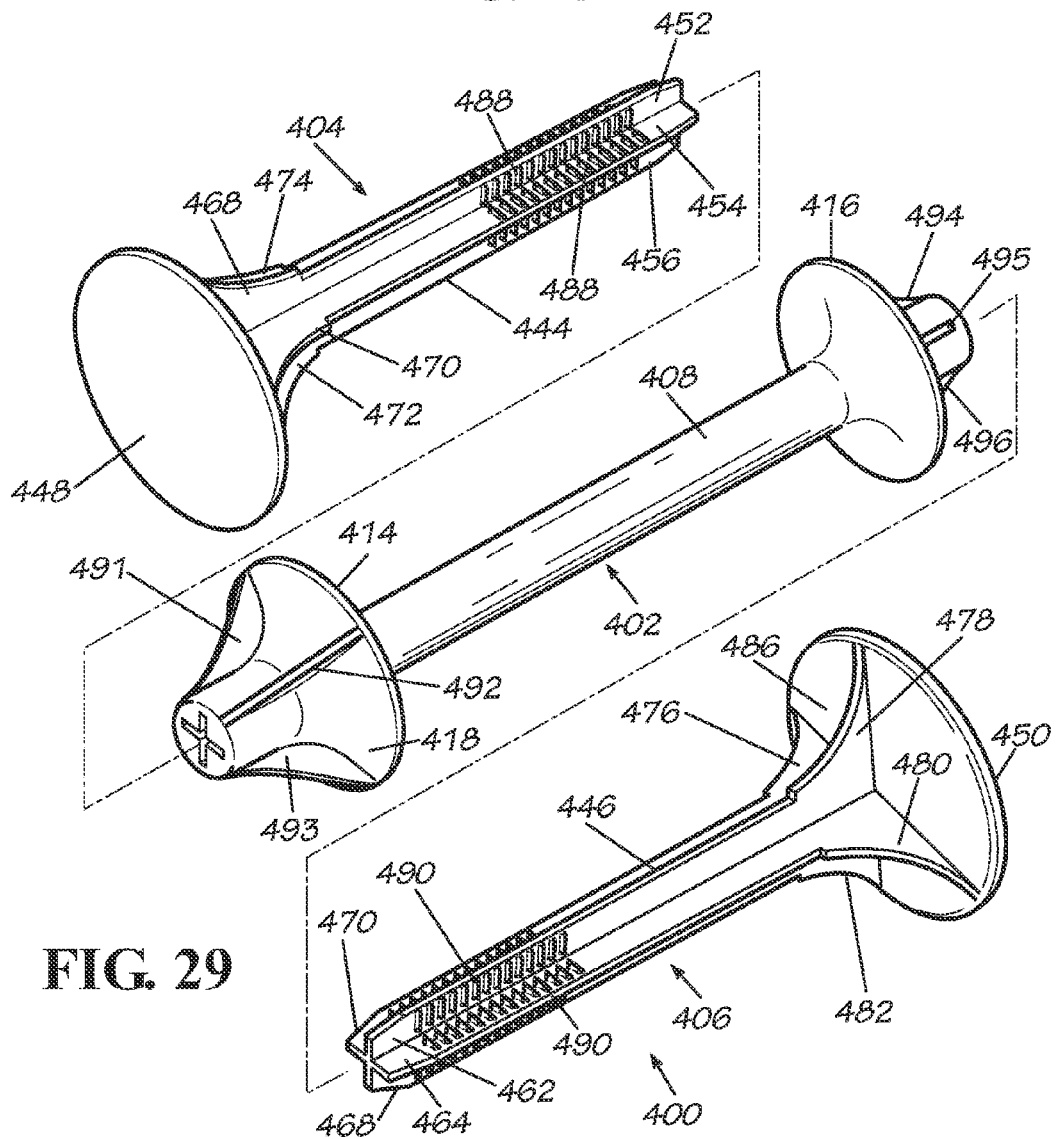
FIG. 29 is an exploded perspective view of an alternative disclosed embodiment of a foam insulating panel pin and spacer system in accordance with the present invention.
Figure 33:
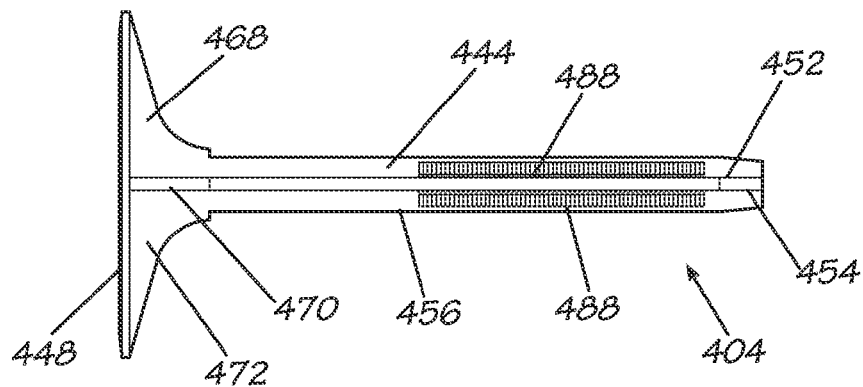
FIG. 33 is a top plan view of one of the pin members shown in FIG. 29.

The insulated concrete form 10 is assembled by inserting the shaft portion 444 of the first pin member 404 through the hole 90 in the first foam insulating panel 12, aligning the stiffening wings 468-474 with the slots 106-112, until the panel contacting portion 484 of the enlarge head portion 448 contacts the outer surface 84 (or the layer of reinforcing material, if used) of the first foam insulating panel and the shaft portion extends outwardly from the inner surface 80 of the first foam insulating panel. The stiffening wings 468-474 being received in the slots 106-112 prevent the first pin member 404 from rotating relative to the first panel member 12. The panel spacer member 402 is then attached to the first pin member 404 by inserting the shaft portion 444 protruding from the first form insulating panel 12 into the pin receiving cavity 426 such that the panel contacting portion 418 of the annular flange 414 contacts the inner surface 80 of the first foam insulating panel and the end of the nipple contacts the shoulders 102. Four stiffening wings 491, 492, 493 (only three of which are shown) and 494, 495, 496, (only three of which are shown) extending radially outwardly from each of the nipples 497, 498 are also formed on the opposite ends of the panel spacer member 402 and are spaced circumferentially 90 degrees from each other (FIG. 29). As the shaft portion 444 of the first pin member 402 is inserted into the pin receiving cavity 426, the fingers 442 of the latch members 440 in the pin receiving cavity slide over the teeth 488 on the legs 452-458 of the shaft portion and permit the shaft portion to be inserted into the pin receiving cavity. When the shaft portion 444 of the first pin member 404 is fully inserted into the pin receiving cavity 426, the fingers 442 of the latch members 440 engage the teeth 488 of the shaft portion thereby preventing movement of the shaft portion out of the pin receiving cavity thereby locking the first pin member and the panel spacer member 402 together and capturing the first foam insulating panel 12 between the annular flange 414 on the panel spacer member and the enlarged head 448 of the first pin member 404. When the panel contacting surface 418 of the annular flange 414 contacts the inner surface 80 of the first foam insulating panel 12 sufficient addition pressure is applied pushing the first pin member 404 and the panel spacer member 402 together such that the foam of the first foam insulating panel is compressed slightly thereby providing a tight seal between the panel contacting portion 418 and the inner surface 80, between the end of the nipple and the shoulders 102 and between the panel contacting portion 484 and the outer surface 84 thereby providing a water-proof or substantially water-proof seal. Since the wings 468-474 are received in the slots 106-110 in the first foam insulating panel, rotation of the first pin member 404 relative to the first foam insulating panel 12 is prevented. Similarly, since the wings 491-493 are received in the slots 106-110 in the first foam insulating panel rotation of the panel spacer member 402 relative to the first foam insulating panel 12 is prevented.

The second foam insulating panel 14 and the panel spacer member 402 are then brought together such that the of the panel spacer member is inserted into the hole 96 in the second foam insulating panel, the panel contacting portion 420 of the annular flange 416 contacts the inner surface 82 and the end of the nipple contacts the shoulders (not shown) at the intersection of the hole 92 and the hole 96, aligning the wings 494-496 with the corresponding slots (not shown) in the second foam insulating panel 14. The shaft portion 446 of the second pin member 406 is then inserted into the hole 92 in the second foam insulating panel 14, aligning the stiffening wings 476-482 with corresponding slots (not shown) of the second foam insulating panel, until the panel contacting portion 486 of the enlarge head portion 450 contacts the outer surface 86 of the second foam insulating panel (or the layer of reinforcing material, if used) and the shaft portion of the second pin member is fully inserted into the pin receiving cavity 428 of the panel spacer member 402. The stiffening wings 476-482 being received in the corresponding slots (not shown) prevent the second pin member 406 from rotating relative to the second panel member 14. Similarly, since the wings 494-496 are received in the corresponding slots (not shown) in the second foam insulating panel 14, rotation of the panel spacer member 402 relative to the second foam insulating panel 14 is prevented. As the shaft portion 446 of the second pin member 406 is inserted into the pin receiving cavity 428, the fingers 442 of the latch members 440 slide over the teeth 490 on the legs 460-466 of the shaft portion and permit the shaft portion to be inserted into the pin receiving cavity. When the shaft portion 446 of the second pin member 406 is fully inserted into the pin receiving cavity 428, the fingers 442 of the latch members 440 will engage the teeth 488 of the shaft portion thereby preventing movement of the shaft portion out of the pin receiving cavity thereby locking the second pin member and the panel spacer member 402 together and capturing the second foam insulating panel 14 between the annular flange 416 on the panel spacer member and the enlarged head 450 of the second pin member 406. When the panel contacting surface 420 of the annular flange 416 contacts the inner surface 82 of the second foam insulating panel 14 sufficient addition pressure is applied pushing the second pin member 406 and the panel spacer member 402 together such that the foam of the second foam insulating panel is compressed slightly thereby providing a tight seal between the panel contacting portion 420 and the inner surface 82, between the end of the nipple and the shoulders (not shown) at the intersection of the hole 92 and the hole 96 and between the panel contacting portion 486 and the outer surface 86 thereby providing a water-proof or substantially water-proof seal.

Figure 36:
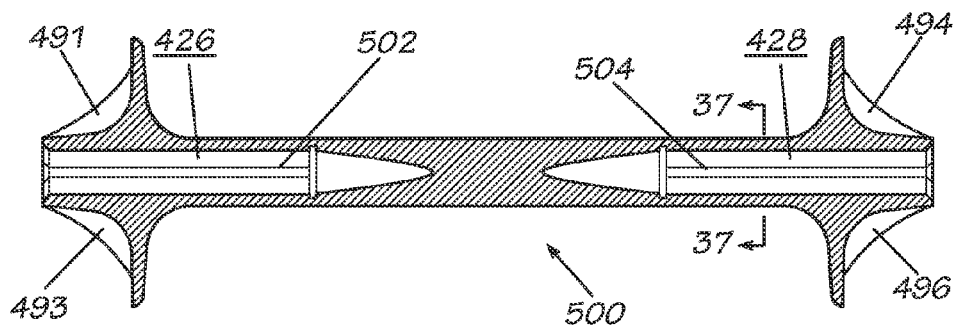
FIG. 36 cross-sectional side view of an alternative disclosed embodiment of the panel spacer member shown in FIG. 30.
Figure 37:
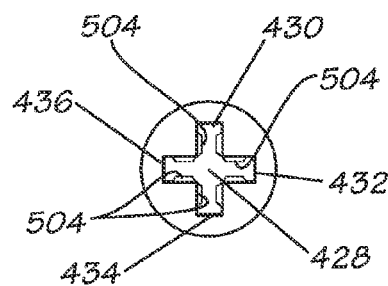
FIG. 37 is cross-sectional view taken along the line 37-37 of the panel spacer member shown in FIG. 36.
Figure 38:
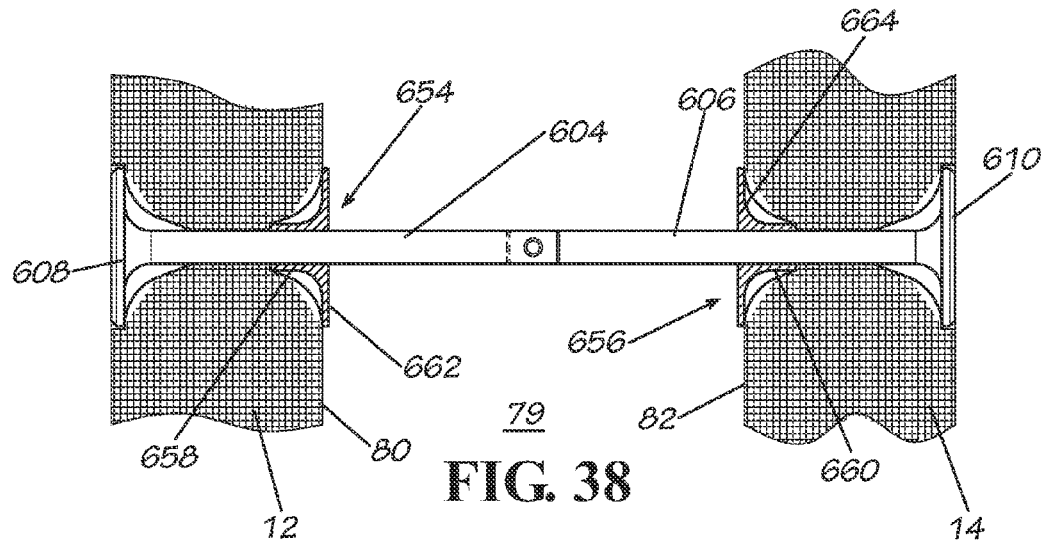
FIG. 38 is an end cross-sectional view of an alternative disclosed embodiment of the insulated concrete form system of the present invention.
Figure 39:
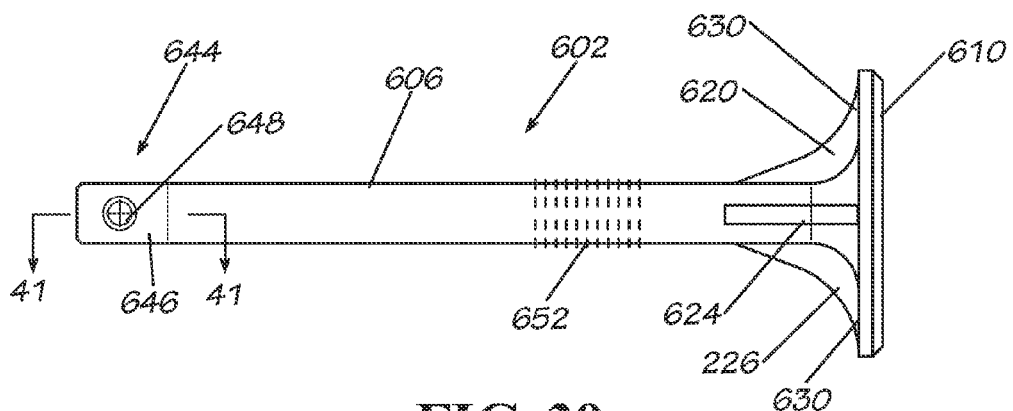
FIG. 39 is a top plan view of one of the pin members shown in FIG. 38.
Figure 40:
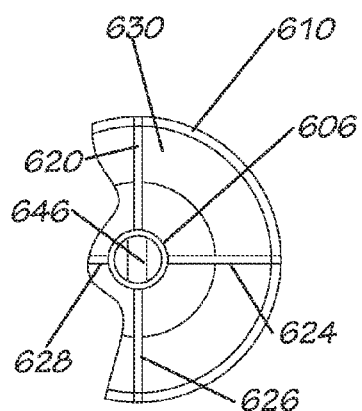
FIG. 40 is an end view of the pin member shown in FIG. 39.

With reference to FIG. 36-37 there is shown an another alternate disclosed embodiment of a panel spacer member 500, which is designed to work with the first and second pin members 402, 404. The panel spacer member 500 shown in FIG. 36 is identical to the panel spacer member 408 shown in FIGS. 30, 31 and 32, except that the panel spacer member 500 does not have the latch members 440 and the fingers 442. Instead, formed inside each leg 430, 432, 434 and 438 of each of the pin receiving cavities 426, 428 of the panel spacer member 500 are a plurality of teeth 502, 504, respectively. The teeth 502, 504 are angled toward the middle of the central rod member 408. The outer diameter of the shaft portions 444, 446 and the inner diameter of the pin receiving cavities 426, 428 of the panel spacer member 500 and the material from which the teeth 448 and the teeth 502, 504 are made are such that the teeth will flex sufficiently to allow the shaft portions 444, 446 to be inserted into the pin receiving cavities 426, 428 of the panel spacer member 500. However, after the shaft portions 444, 446 are inserted into the pin receiving cavities 426, 428 of the panel spacer member 500, the teeth 448 mate with the teeth 502, 504 and prevent removal of the shaft portions from the pin receiving cavities. The teeth 448, 502, 504 therefore provide a one-way locking mechanism; i.e., the first and second pin members 404, 406 can be relatively easily inserted into the panel spacer member 500, but once inserted, the pin members are locked in place and cannot be removed from the panel spacer member under expected pressure loads. The insulated concrete form 10 in accordance with disclosed embodiments of the present invention using the first and second pin members 404, 406 and the panel spacer member 500 is assembled in the same manner as described above using the first and second pin members 404, 402 and the panel spacer member 408.

With reference to FIGS. 38-47, there is shown another alternate disclosed embodiment of the spacer/pin assembly 16. FIGS. 38-47 show a first pin member 600 and a second pin member 602. The first and second pin members 600, 602 are preferably formed from a polymeric material, such as polyethylene, polypropylene, nylon or the like, and can be formed by any suitable process, such as by injection molding.

The first and second pin members 600, 602 each include a elongate shaft portion 604, 606, respectively and an enlarged head portion 608, 610, respectively. The elongate shaft portions 604, 606 are each generally circular in cross-sectional shape and are of a length such that the shaft portion can extend all of the way through the thickness of the foam insulating panels 12, 14 and to the midpoint of the concrete receiving space 79. The enlarged head portions 608, 610 are each generally of a flat disk shape and each includes four stiffening wings 612, 614, 616, 618 and 620, 622, 624, 626 (FIGS. 39, 40, 42 and 43), respectively, extending from the enlarged head portions to the elongate shaft portions 604, 606, respectively, and are spaced evenly around the circumference of the enlarged head portions. The stiffening wings 612-626 provide extra strength to the enlarged head portions 608, 610 of the first and second pin members 600, 602. Each of the enlarged head portions 608, 610 includes a generally flat foam insulating panel contacting portion 628, 630, respectively (FIGS. 40, 43), adjacent it circumferential edge.

Figure 41:
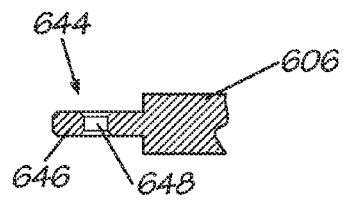
FIG. 41 is a cross-sectional view taken along the line 41-41 of the pin member shown in FIG. 39.
Figure 42:
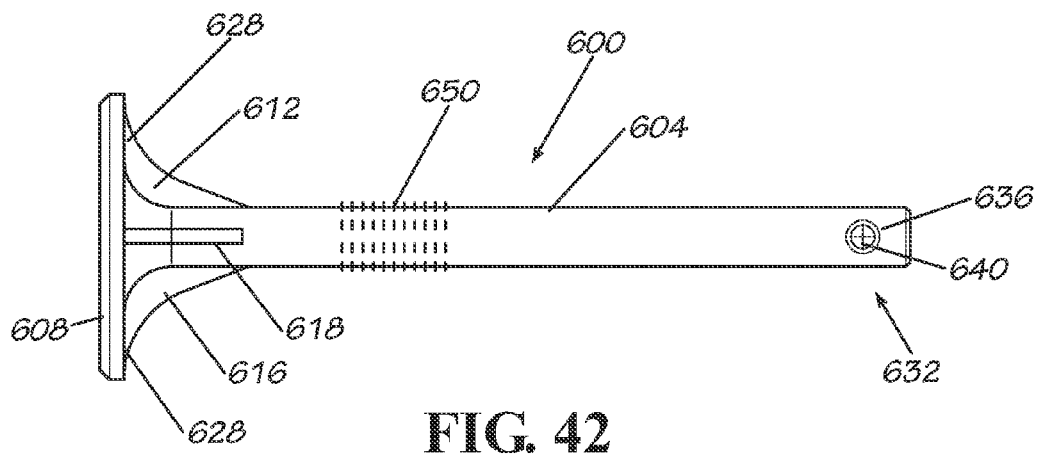
FIG. 42 is a top plan view of the other pin member shown in FIG. 38.
Figure 43:
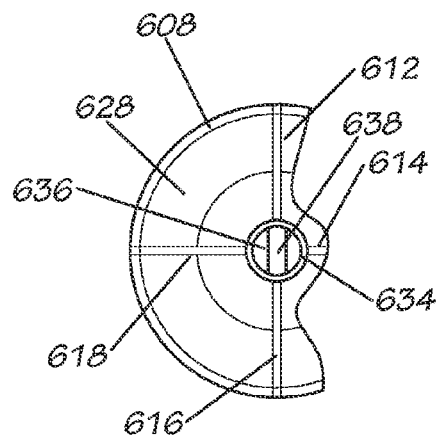
FIG. 43 is an end view of the pin member shown in FIG. 42.
Figure 44:
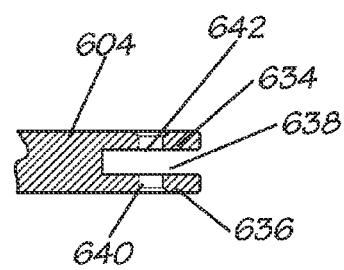
FIG. 44 is a cross-sectional view taken along the line 44-44 of the pin member shown in FIG. 42.
Figure 45:
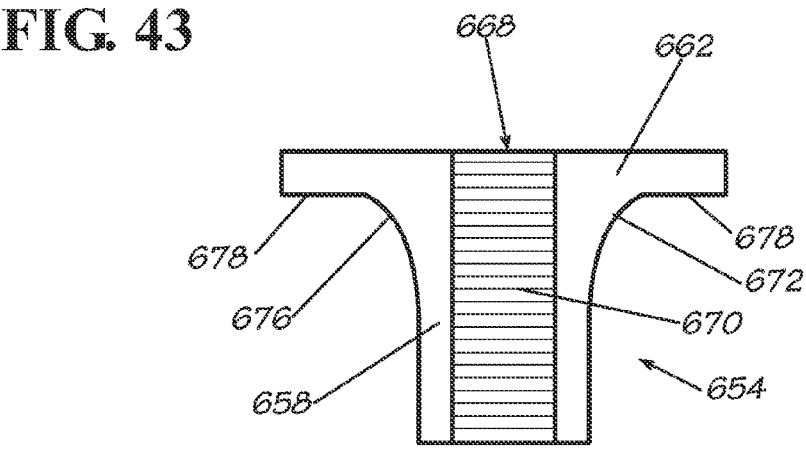
FIG. 45 is a cross-sectional side view of one of the cap members shown in FIG. 38.
Figure 46:
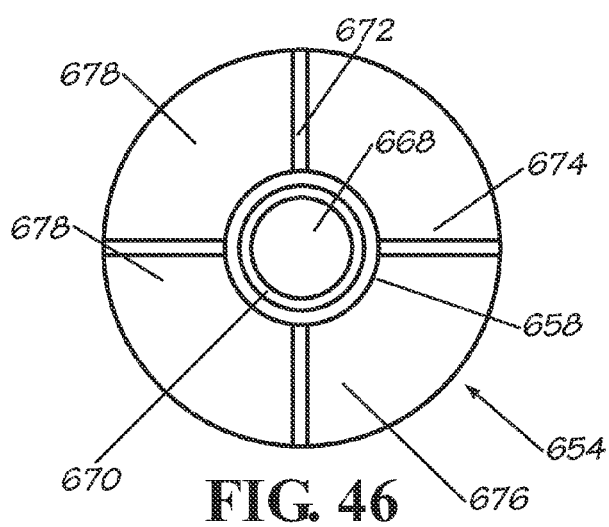
FIG. 46 is an end view of the one of the cap members shown in FIG. 38.

The end 632 the shaft portion 604 of the first pin member 600 opposite the enlarged head portion 608 includes two leg portions 634, 636 spaced from each other and defining a channel 638 there between (FIG. 44). A hole 640 is formed in the leg 636 and extend completely through the leg 636 and is axially aligned with a hole 642 formed in the leg 634 and extend completely there through. The end 644 of the shaft portion 606 of the second pin member 602 opposite the enlarged head portion 610 includes a tongue portion 646 (FIG. 41). A hole 648 is formed in the tongue portion 646 and extends completely there through. The tongue portion 646 is sized and shaped to be received in the channel 638 formed between the legs 634, 636 such that the hole 648 will be in axial alignment with the holes 640, 642 as shown in FIG. 47.

Formed on the shaft portions 604, 606 adjacent the enlarged head portions 608, 610 of each of the pin members 600, 602 are locking teeth 650, 652, respectively. Caps 654, 656 are provided to fit on the shaft portions 604, 606, respectively, of each of the pin members 600, 602. Each of the caps 654, 656 includes a body portion 658, 660 and an enlarged head portion 662, 664. Each of the cap members 654, 656 has an axial bore 668 formed therein which extend completely through the cap member. The axial bore 668 is sized and shaped such that the shaft portions 604, 606 will fit in the axial bores 668 of each of the cap members 654, 656 and the cap members will easily slide on the shaft portions. Formed in the axial bore 668 of each of the cap members 654, 656 are locking teeth 670 which are sized and shaped to mate with the teeth 650, 652 on the shaft portions 604, 606, respectively, of the first and second pin members 600, 602. Each of the cap members 654, 656 also includes stiffening wigs 672, 674, 676, 678 extending from the enlarged head portions 662, 664 to the body portions 658, 660 and are spaced evenly around the circumference of the enlarged head portions. The stiffening wings 672-678 provide extra strength to the enlarged head portions 662, 664 of the cap members 654, 656. The teeth 650, 652, 670 are designed such that when the teeth 670 engage the teeth 650, 652, thereby holding the cap members 654, 656 in place on the shaft portions 604, 606. The enlarged head portions 662, 664 of the cap members 654, 656 are each generally a flat disk shape and each include a flat foam insulating panel contacting portion 678.

The insulated concrete form 10 is assembled by inserting the shaft portion 604 of the first pin member 600 through the hole 90 in the first foam insulating panel 12, aligning the stiffening wings 612-618 with the slots 106-112, until the panel contacting portion 628 of the enlarge head portion 608 contacts the outer surface 84 (or the layer of reinforcing material, if used) of the first foam insulating panel and the shaft portion extends outwardly from the inner surface 80 of the first foam insulating panel. The shaft portion 606 of the second pin member 602 is then inserted into the hole 92 in the second foam insulating panel 14, aligning the stiffening wings 620-628 with corresponding slots (not shown) in the outer surface 86 of the second foam insulating panel, until the panel contacting portion 630 of the enlarge head portion 610 contacts the outer surface 86 of the second foam insulating panel (or the layer of reinforcing material, if used) and the shaft portion of the second pin member extends outwardly from the inner surface 82 of the second foam insulating panel. The cap members 654, 656 are then placed on the shaft portions 604, 606, respectively, such that the shaft portions extend through the axial bores 668 and the enlarged head portions 662, 664 of the cap members face away from the foam insulating panels 12, 14, respectively, and the body portions 658, 660 toward the foam insulating panels 12, 14, respectively. The cap members 654, 656 are then slid on the shaft portions 604, 606, respectively toward the foam insulating panels 12, 14, respectively, until the teeth 670 of the cap members engage the teeth 650, 652 on the shaft portions 604, 606, respectively. The cap members 654, 656 are pushed toward the foam insulating panel members 12, 14, respectively, until the foam insulating panel contacting portions 678 of the cap members contact the inner surfaces 80, 82 of the foam insulating panels 12, 14. Additional pressure on the cap members 654, 656 is applied so that the foam insulating panels 12, 14 are captured tightly between the enlarged head portions 608, 610 of the pin members 600, 602 and the enlarged head portions 662, 664 of the cap members 654, 656. The tight fit of the foam insulating panel contacting surface 628, 630 against the outer surfaces 84, 86 (or the layer of reinforcing material, if used) of the first and second foam insulating panels 12, 14, respectively, and the tight fit of the foam insulating panel contacting surface 678, 680 against the inner surfaces 80, 82 of the first and second foam insulating panels 12, 14, respectively, provides a water-proof or substantially water-proof seal between the first and second pin members 600, 602 and the first and second foam insulating panels 12, 14.

Figure 47:
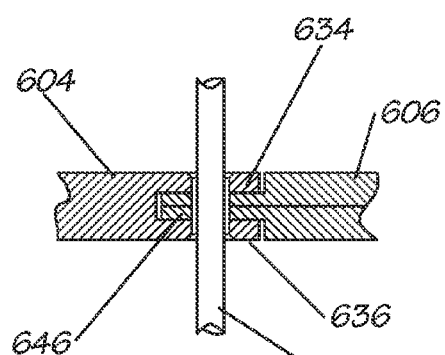
FIG. 47 is a partial detailed top plan view of the joint formed between the two pin members shown in FIG. 38, showing a rebar received in the holes through the end of the two pin members.

The first foam insulating panel 12 is then positioned spaced from and parallel to the second foam insulating panel 14 such that the tongue portion 646 of the second pin member 602 is received in the channel 638 of the first pin member 600 and the holes 640, 642, 648 are axially aligned as shown in FIG. 47. A metal reinforcing member 680, such as a steel rebar, is inserted longitudinally through the holes 640, 642, 648 thereby locking the first pin member 600 to the second pin member 602, which also thereby prevents the first and second foam insulating panels 12, 14 from moving toward each other or away from each other.

In a disclosed embodiment of the present invention, the elongate portions of the anchor member comprise the elongate central rod member 24 and the elongate shaft portions 46, 48.

It should be understood, of course, that the foregoing relates only to certain disclosed embodiments of the present invention and that numerous modifications or alterations may be made therein without departing from the spirit and scope of the invention as set forth in the appended claims.

What is claimed is:

1. A method comprising:
   positioning a first foam insulating panel on a support surface, the first foam insulating panel having a first primary surface and an opposite second primary surface, wherein the first foam insulating panel is expanded polystyrene foam and wherein a first reinforcing member contacts and substantially covers the first primary surface of the first foam insulating panel and wherein the first reinforcing member is a discontinuous layer or a mesh; and
   positioning a second foam insulating panel on a support surface spaced from the first foam insulating panel thereby defining a concrete receiving space between the second primary surface of the first foam insulating panel and the second primary surface of the second foam insulating panel, the second foam insulating panel having a first primary surface and an opposite second primary surface, wherein the second foam insulating panel is expanded polystyrene foam and wherein a second reinforcing member contacts and substantially covers the first primary surface of the second foam insulating panel and wherein the second reinforcing member is a discontinuous layer or a mesh; and
   positioning an anchor member in the first foam insulating panel, the anchor member having a first enlarged portion and an elongate portion, wherein the first enlarged portion is adjacent a first end of the elongate portion, the anchor member being disposed such that the elongate portion extends through the first foam insulating panel and at least a portion of the first reinforcing member is disposed between the first primary surface of the first foam insulating panel and the first enlarged portion of the anchor member and wherein the elongate portion extends outwardly from the second primary surface of the first foam insulating panel and wherein the first enlarged portion comprises a flange extending radially outwardly from the elongate portion.

2. The method of claim 1, further comprising:
   positioning the anchor member in the second foam insulating panel, the anchor member having a second enlarged portion adjacent a second end of the elongate portion, the anchor member being disposed such that the elongate portion extends through the second foam insulating panel and at least a portion of the second reinforcing member is disposed between the first primary surface of the second foam insulating panel and the second enlarged portion of the anchor member and wherein the second enlarged portion comprises a flange extending radially outwardly from the elongate portion.

3. The method of claim 1, wherein the first reinforcing member is made from plastic or fiberglass.

4. The method of claim 1, wherein the first reinforcing member is a fiberglass mesh.

* * * * *